(12) United States Patent
Lee et al.

(10) Patent No.: US 9,950,703 B2
(45) Date of Patent: Apr. 24, 2018

(54) VEHICLE WITH INDEPENDENTLY DRIVEN MULTIPLE AXES, AND CONTROLLER WHICH INDEPENDENTLY DRIVES MULTIPLE AXLES

(71) Applicants: SAMSUNG TECHWIN CO., LTD., Kyongsangnam-do (KR); SNU R&DB FOUNDATION, Kyongsangnam-do (KR)

(72) Inventors: Jong-seok Lee, Changwon (KR); Kyoung-su Yi, Seoul (KR); Won-gun Kim, Seoul (KR); Soung-yong Joung, Changwon (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 283 days.

(21) Appl. No.: 14/312,280

(22) Filed: Jun. 23, 2014

(65) Prior Publication Data

US 2014/0379220 A1 Dec. 25, 2014

Related U.S. Application Data

(63) Continuation-in-part of application No. 13/883,037, filed as application No. PCT/KR2011/007550 on Oct. 12, 2011, now abandoned.

(30) Foreign Application Priority Data

Nov. 2, 2010 (KR) .................. 10-2010-0108413

(51) Int. Cl.
*B60W 10/20* (2006.01)
*B60W 10/18* (2012.01)
(Continued)

(52) U.S. Cl.
CPC ............ *B60W 10/20* (2013.01); *B60W 10/18* (2013.01); *B60W 30/18172* (2013.01);
(Continued)

(58) Field of Classification Search
None
See application file for complete search history.

(56) References Cited

U.S. PATENT DOCUMENTS 5,270,930 A * 12/1993 Ito .................. B60K 17/346
477/35
5,701,247 A 12/1997 Sasaki
(Continued)

FOREIGN PATENT DOCUMENTS

JP          2009-35103 A     2/2009
KR    10-2005-0076860 A     7/2005
(Continued)

OTHER PUBLICATIONS

International Search Report (PCT/ISA/210) dated May 31, 2012, issued in International Application No. PCT/KR2011/007550.
(Continued)

*Primary Examiner* — Abby Y Lin
*Assistant Examiner* — Paul A Castro
(74) *Attorney, Agent, or Firm* — Sughrue Mion, PLLC

(57) ABSTRACT

A vehicle with independently driven multiple axles and a controller which independently drives the multiple axles are disclosed. The controller includes a first controller which determines a target control value including at least one of a mechanical steering angle of each of a plurality of wheels of a vehicle, a target yaw moment of the vehicle, a target longitudinal force of the vehicle, and a target wheel speed of each of the plurality of wheels; and a second controller which determines wheel torques of the plurality of wheels, which drive the plurality of wheels independently, based on
(Continued)

the target control value, wherein the wheel torques of the plurality of wheels are different from one another.

28 Claims, 21 Drawing Sheets

(51) Int. Cl.
*B60W 30/18* (2012.01)
*B60W 10/04* (2006.01)

(52) U.S. Cl.
CPC ......... *B60W 10/04* (2013.01); *B60W 2520/30* (2013.01); *B60W 2540/12* (2013.01); *B60W 2540/18* (2013.01); *B60W 2710/207* (2013.01); *B60W 2720/14* (2013.01)

(56) References Cited

U.S. PATENT DOCUMENTS

| | | | |
|---|---|---|---|
| 2008/0249690 A1* | 10/2008 | Matsumoto | B60W 10/06 701/48 |
| 2009/0112437 A1 | 4/2009 | Luehrsen et al. | |
| 2010/0204887 A1 | 8/2010 | Ichinose et al. | |
| 2011/0209938 A1* | 9/2011 | Basadzishvili | B60G 3/01 180/305 |
| 2011/0257826 A1* | 10/2011 | Yu | B60K 6/448 701/31.4 |
| 2012/0043159 A1* | 2/2012 | Clark | B62D 7/1509 182/69.6 |
| 2012/0109411 A1 | 5/2012 | Tokimasa et al. | |
| 2012/0109484 A1 | 5/2012 | Onoda et al. | |
| 2012/0245796 A1 | 9/2012 | Yu et al. | |

FOREIGN PATENT DOCUMENTS

| | | | |
|---|---|---|---|
| KR | 10-2008-0054752 A | 6/2008 | |
| KR | 10-2009-0062321 A | 6/2009 | |
| KR | 10-2010-0032244 A | 3/2010 | |
| KR | 10-2010-0036539 A | 4/2010 | |
| WO | WO 2007128073 A1 * | 11/2007 | B62D 13/005 |

OTHER PUBLICATIONS

Written Opinion (PCT/ISA/237) dated May 31, 2012, issued in International Application No. PCT/KR2011/007550.
Kim, Wongun, et al., "A Development of Integrated Driving Controller for 8 Wheel Driving Vehicle", KSAE May 2010 pp. 714-723.
Kim, Wongun, et al., "A Development of Autonomous Control Algorithm and Verification Test for a 6WD/6WS Vehicle", KSME Nov. 2009, pp. 754-759.

* cited by examiner

VEHICLE WITH INDEPENDENTLY DRIVEN MULTIPLE AXES, AND CONTROLLER WHICH INDEPENDENTLY DRIVES MULTIPLE AXES

CROSS-REFERENCE TO RELATED PATENT APPLICATIONS

This application is a continuation-in-part of U.S. patent application Ser. No. 13/883,037, filed on May 2, 2013, which is a national stage application of a PCT International Application PCT/KR2011/007550, filed Oct. 12, 2011, and claims priority from Korean Patent Application No. 10-2010-0108413 filed on Nov. 2, 2010 in the Korean Intellectual Property Office, the disclosures of which are incorporated herein in their entirety by reference.

BACKGROUND

1. Field

Apparatuses consistent with exemplary embodiments relate to a vehicle with independently driven multiple axles, and more particularly, to a vehicle with independently driven multiple axles which may apply different driving and/or braking inputs to a plurality of wheels and a controller which independently drives the multiple axles of the vehicle.

2. Description of the Related Art

There is increasing demand for improved vehicle stability and increased driver convenience. Also, research into active safety systems and driver assistance systems has been actively conducted.

An electronic stability control (ESC) system or the like is used as an active safety braking system. Also, an active front steering (AFS) system or the like is used as an active steering system. Also, a traction control system (TCS) for controlling the torque of an engine and a direct yaw control (DYC) system using a differential axle device are used as a driving force control system.

An active safety system determines a state of a vehicle by using a yaw-rate sensor, a lateral acceleration sensor, and a wheel speed sensor mounted in the vehicle. In this case, if it is determined that the state of the vehicle is an unstable state, a control input necessary for changing the unstable state of the vehicle to a stable state is calculated and applied.

At least some wheels of an electric vehicle or a hybrid vehicle may be driven by a motor.

SUMMARY

One or more exemplary embodiments provide a vehicle with independently driven multiple axles which may improve driving performance and/or stability by determining different driving and/or braking inputs to be applied to some wheels in response to an operation input and independently driving these wheels.

According to an aspect of an exemplary embodiment, there is provided a vehicle with independently driven multiple axles, the vehicle including: a plurality of wheels; an operation input unit which receives an operation input including at least one of a steering input, an acceleration input, and a braking input; a first controller which determines a target control value comprising at least one of a mechanical steering angle of each of the plurality of wheels, a target yaw moment of the vehicle, a target longitudinal force of the vehicle, and a target wheel speed of each of the plurality of wheels, from the operation input, according to a driving condition of the vehicle; and a second controller which determines wheel torques of the plurality of wheels, which drive the plurality of wheels independently, based on the target control value.

The vehicle may further include: motors of which rotation axles are connected to rotation axles of the plurality of wheels, respectively, and which drive the plurality of wheels through the wheel torques, respectively; a plurality of brakes which are installed on the plurality of wheels, respectively; and a steering means which is linked to at least one of the plurality of wheels and adjusts a steering angle of the at least one of the plurality of wheels.

The driving condition may include: a normal driving mode in which the vehicle is controlled by at least one of mechanical steering, complex braking, stability control, and slip control, wherein the mechanical steering is performed by the steering means to adjust the steering angle, and the complex braking comprises regenerative braking generated by the motors and braking generated by the plurality of brakes; a quick turning driving mode in which the vehicle is controlled by at least one of complex steering, the complex braking, the stability control, and the slip control, wherein the complex steering comprises the mechanical steering and wheel torque steering; and a pivot turning mode in which the vehicle is controlled by the complex steering, wherein the complex steering for the pivot turning mode does not include the mechanical steering.

The vehicle may be controlled by a steering control program comprising at least one of the mechanical steering, the stability control, the wheel torque control, and wheel speed control according to a driving situation.

The driving situation is determined by at least one of a speed of the vehicle and a condition of a road on which the vehicle is driven.

For wheel torque control, the first controller may receive the steering input and a target speed of the vehicle and determines the mechanical steering angle of each of the plurality of wheels, the target yaw moment of the vehicle, and the target longitudinal force of the vehicle.

The first controller may determine: the mechanical steering angle of each of the plurality of wheels from the steering input; a target yaw rate of the vehicle from the mechanical steering angle of each of the plurality of wheels in consideration of a time delay; and the target yaw moment of the vehicle by feeding back a measured yaw rate of the vehicle to the target yaw rate of the vehicle to perform yaw rate control.

For the yaw rate control, the target yaw moment of the vehicle may be determined by a sliding control method in which a sliding surface determined from a difference between the measured yaw rate of the vehicle and the target yaw rate of the vehicle is converged to 0 by enabling a differential coefficient of the sliding surface relative to time to always have a sign opposite to that of the sliding surface.

The target longitudinal force may be determined by a proportional integral derivative control method in which a difference between the target speed of the vehicle and a measured speed of the vehicle is calculated as an error and proportional, integral, and derivative gains are multiplied by the error.

For the wheel torque control, the second controller may determine a tire force of each of the plurality of wheels by receiving the target longitudinal force of the vehicle and the target yaw moment of the vehicle, and distributing the target longitudinal force of the vehicle and the target yaw moment of the vehicle as a force to be exerted at a bottom of a tire of each of the plurality of wheels, and determines the wheel torques of the plurality of wheels by wheel slip control from the tire force of each of the plurality of wheels.

The vehicle may be a type of a 4-wheel vehicle, a 6-wheel vehicle, or an 8-wheel vehicle, and the target yaw moment may be determined according to the type of the vehicle.

A friction circle may be determined from a maximum force which may be generated in each of the plurality of wheels according to a driving situation, and the tire force may be determined in proportion to a size of the friction circle.

The estimated friction circle may be compensated such that a difference between the estimated tire forces by using the performance index and a longitudinal tire force determined by using a relationship between a slip ratio and a longitudinal tire force is minimized.

The difference may be minimized using a Recursive Least Square (RLS) method.

Wheel angular acceleration may be estimated from wheel angular speed, a first vehicle speed may be estimated from the wheel angular speed and a vehicle yaw rate, a wheel angular speed with a higher angular acceleration is excluded, a second vehicle speed may be estimated from a longitudinal vehicle speed, and a resultant vehicle speed may be estimated by summing the first vehicle speed and the second vehicle speed.

The tire force of each of the plurality of wheels may be determined by using optimal distribution of force using a performance index proportional to the size of the friction circle.

A friction force of each of the plurality of wheels may be estimated and input and the performance index proportional to the size of the friction circle may be obtained.

A target wheel speed may be calculated by reflecting a slip ratio of each of the plurality of wheels, a difference between the target wheel speed and a wheel speed of each of the plurality of wheels may be defined as a sliding surface, and each of the wheel torques may be determined by inserting a state condition for converging the sliding surface to 0 into a wheel torque equation of each of the plurality of wheels. If the slip ratio of each of the plurality of wheels does not exceed a maximum slip ratio, each of the wheel torques may be directly determined from the tire force determined by the distribution of the tire force. The wheel speed and the tire force of each of the plurality of wheels may be estimated and input.

For wheel speed control, the first controller may receive the steering input and a target speed of the vehicle, and determines the mechanical steering angle of each of the plurality of wheels and the target wheel speed of each of the plurality of wheels.

The first controller may determine the mechanical steering angle of each of the plurality of wheels from the steering input, a target yaw rate of the vehicle from the mechanical steering angle of each of the plurality of wheels in consideration of a time delay; and the target wheel speed of each of the plurality of wheels by adding a wheel speed of each of the plurality of wheels due to feedforward control and a wheel speed of each of the plurality of wheels due to feedback control using a difference between the target yaw rate of the vehicle and a measured yaw rate of the vehicle.

The second controller may: define a difference between the target wheel speed and a wheel speed of each of the plurality of wheels as a sliding surface, determine a driving torque input by using an adaptive sliding method using a tire force of each of the plurality of wheels as an unknown element, and determine the wheel torque by estimating the unknown element by using Lyapunov stability.

According to an aspect of another exemplary embodiment, there is provided a controller which independently drives multiple axles, the controller including: a control unit which generates at least one target control value from an operation input, and determines driving forces of a plurality of wheels of a vehicle independently, based on the at least one target control value and according to a driving situation of the vehicle, the driving forces being different from one another, wherein the at least one target control value is one or more of a steering angle of each of the plurality of wheels, a target yaw moment of the vehicle, a target longitudinal force of the vehicle, and a target wheel speed of each of the plurality of wheels.

According to an aspect of another exemplary embodiment, there is provided a controller including: a first controller which determines a target control value including at least one of a mechanical steering angle of each of a plurality of wheels of a vehicle, a target yaw moment of the vehicle, a target longitudinal force of the vehicle, and a target wheel speed of each of the plurality of wheels, according to a driving condition of the vehicle, when the first controller receives an operation input including at least one of a steering input, an acceleration input and a braking input; and a second controller which determines wheel torques of the plurality of wheels, which drive the plurality of wheels independently, based on the target control value, wherein the wheel torques of the plurality of wheels are different from one another.

According to the vehicle with independently driven multiple axes according to the exemplary embodiments, since different driving and/or braking inputs to be applied to at least some wheels are determined in response to an operation input and these wheels are independently driven, driving performance and/or stability may be improved.

BRIEF DESCRIPTION OF THE DRAWINGS

The above and other features and advantages will become more apparent by describing in detail exemplary embodiments with reference to the attached drawings as following.

DETAILED DESCRIPTIONS

Exemplary embodiments will now be described more fully with reference to the accompanying drawings.

Figure 1:
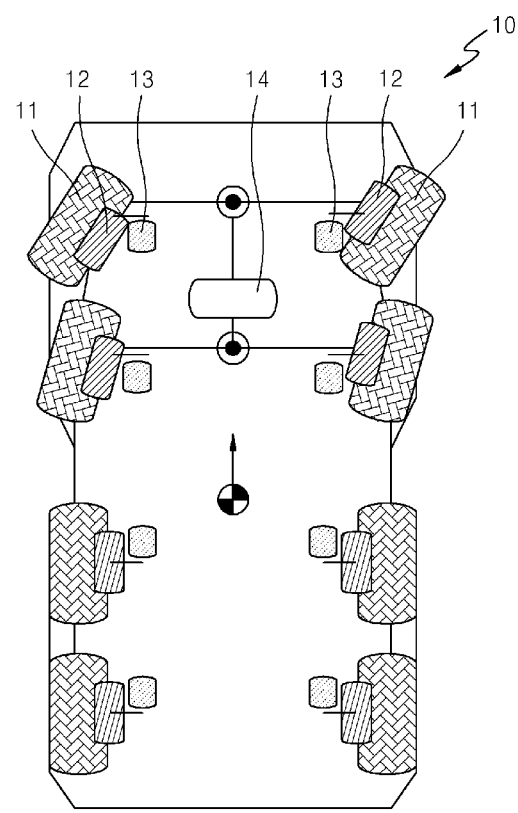
FIG. 1 is a bottom view illustrating a vehicle with independently driven multiple axes, which has an 8-wheel structure, according to an exemplary embodiment.
Figure 2:
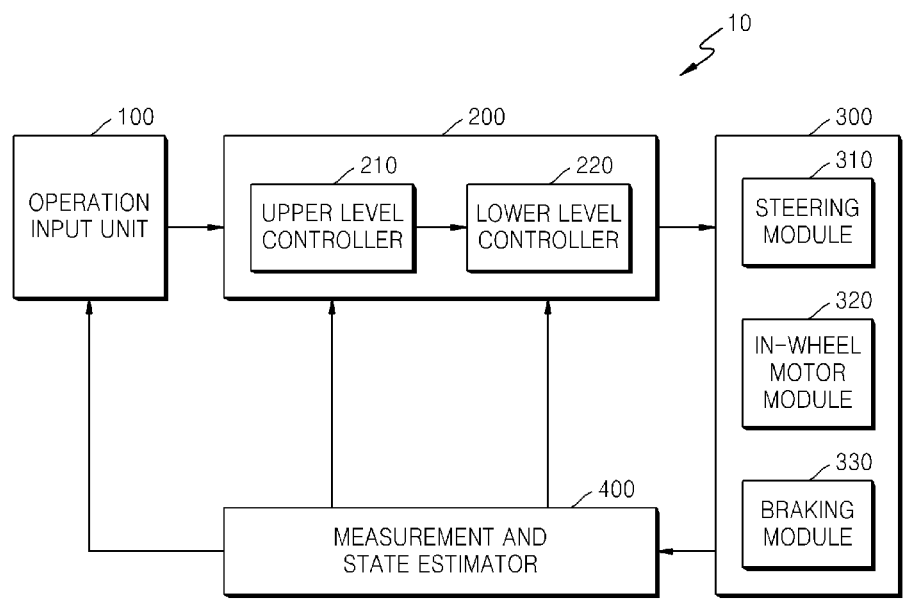
FIG. 2 is a block diagram illustrating a control structure of the vehicle of FIG. 1, according to an exemplary embodiment.

FIG. 1 is a bottom view illustrating a vehicle 10 with independently driven multiple axles, which has an 8-wheel structure, according to an exemplary embodiment. FIG. 2 is a block diagram illustrating a control structure of the vehicle 10 of FIG. 1.

The vehicle 10 may apply different driving and braking forces to wheels 11 which may be independently driven by using in-wheel motors 12. Accordingly, the vehicle 10 may turn beyond a usual mechanically allowable range in response to a drivers operation input.

An upper level controller 210 may calculate a yaw rate with respect to the driver's steering input, and determine a yaw moment and a total longitudinal force of the vehicle 10 for achieving the yaw rate. A lower level controller 220 may determine a driving force and a braking force required by each of the wheels 11, and control a slip ratio for each of the wheels 11 not to exceed a maximum slip ratio. Accordingly, energy efficiency may be improved, and driving performance and stability may be improved.

Meanwhile, in order to improve driver convenience during driving and stability of the vehicle 10, an active safety system and a driver assistance system may be introduced. To this end, an electronic stability control (ESC) system may be used as an active safety braking system and an active front steering (AFS) system may be used as an active steering system.

Also, a traction control system (TCS) using a torque of an engine and a direct yaw control (DYC) system using a differential axle device may be used as a driving force control system.

Such active safety systems may determine a state of the vehicle 10 from a yaw rate sensor, a lateral acceleration sensor, and a wheel speed sensor mounted in the vehicle 10, and if it is determined that a state of the vehicle 10 is an unstable state, may calculate and apply a control input necessary for changing the unstable state of the vehicle 10 to a stable state.

A general vehicle driving control method may be applied to an electric vehicle or a hybrid vehicle. However, an ESC system of a general vehicle may control a yaw moment by distributing only braking forces for wheels, and a differential axel device for adjusting driving force distribution to left and right wheels may limit the slip of the left and right wheels. Accordingly, if existing methods are applied to a vehicle with independently driven axles using an in-wheel driving method, wheels may not be independently driven and braked.

The vehicle 10 of FIG. 1 may be applied to a hybrid wheel armored vehicle with independently driven multiple axles such as a 4-wheel, 6-wheel, or 8-wheel armored vehicle. Since the vehicle 10 has such structural advantages, the vehicle 10 may distribute driving and braking forces such that the vehicle 10 may turn beyond a usual mechanically allowable range.

To this end, a target yaw rate and a target longitudinal speed for achieving predetermined vehicle steering performance and lateral driving stability may be determined, and optimal solutions for driving and braking forces of each of wheels for achieving the target yaw rate and the target longitudinal speed may be applied as inputs.

Referring to FIG. 1, the plurality of wheels 11 are mounted on the vehicle 10, and each of the wheels 11 may be independently driven. To this end, one in-wheel motor 12 may be mounted on each of the wheels 11.

A rotation axle of each of the in-wheel motors 12 may be directly connected to a rotation axle of each of the wheels 11 to drive each of the wheels 11. Each of the in-wheel motors 12 may be directly connected to each of the wheels 11 by means of a deceleration gear without a separate speed change machine connected to each of the wheels 11.

In this case, the vehicle 10 may be an electric vehicle or a hybrid vehicle. If the vehicle 10 is a hybrid vehicle, each of the in-wheel motors 12 installed in each of the wheels 11 may be driven with power produced by the engine.

Also, a mechanical brake 13 may be mounted on each of the wheels 11. Regenerative braking is possible due to a characteristic of each of the in-wheel motors 12 mounted on each of the wheels 1. However, the mechanical brakes 13 respectively mounted on the wheels 11 operate when the vehicle 10 may not be braked only with the regenerative braking of the in-wheel motors 12, thereby improving braking performance of the vehicle 10. In this case, the mechanical brakes 13 may be hydraulic brakes having excellent braking performance.

In FIG. 1, the in-wheel motors 12 and the mechanical brakes 13 may be individually mounted in the wheels 11, respectively. However, the present exemplary embodiment is not limited thereto, and the in-wheel motors 12 and/or the mechanical brakes 13 may be mounted on only some of the wheels 11.

Meanwhile, mechanical steering of the vehicle 10 may be controlled by a steering motor 14. The steering motor 14 may be linked to at least one of the wheels 11, and may adjust a steering angle of the vehicle 10.

The vehicle 10 may determine driving and/or braking inputs to be individually applied to at least some of the wheels 11 in response to an operation input and independently drive those wheels 11. To this end, the vehicle 10 may include an operation input unit 100, an integral controller 200, and an operation module 300.

The operation input unit 100 receives an operation input including at least one of a steering input, an acceleration input, and a braking input. The integral controller 200 may include the upper level controller 210 corresponding to a first controller, and the lower level controller 220 corresponding to a second controller.

The upper level controller 210 may determine a driving control program of the vehicle 10 in consideration of a driving condition of the vehicle 10, and may determine a target control value including at least one of a mechanical steering angle of each of the wheels 11, a target yaw moment of the vehicle 10, a target longitudinal force of the vehicle 10, and a target wheel speed of each of the wheels 11 from an operation input according to the driving control program.

The lower level controller 220 may determine a wheel torque of each of the wheels 11 from the target control value determined by the upper level controller 210 according to the driving control program.

In this case, the vehicle 10 may improve driving performance while maintaining driving stability in various driving situations (e.g., when the vehicle 10 quickly turns at high speed or moves across an open field), because optimal driving and braking inputs are distributed to the in-wheel motors 12 according to the driving condition.

The operation module 300 operates the vehicle 10 according to a control command of the integral controller 200. The operation module 300 may include a steering module 310, an in-wheel motor module 320, and a braking module 330.

The steering module 310 may include the steering motor 14. The steering module 310 may adjust a mechanical steering angle of the vehicle 10 by being linked to the steering motor 14 and adjusting angles of steering wheels.

Figure 20:
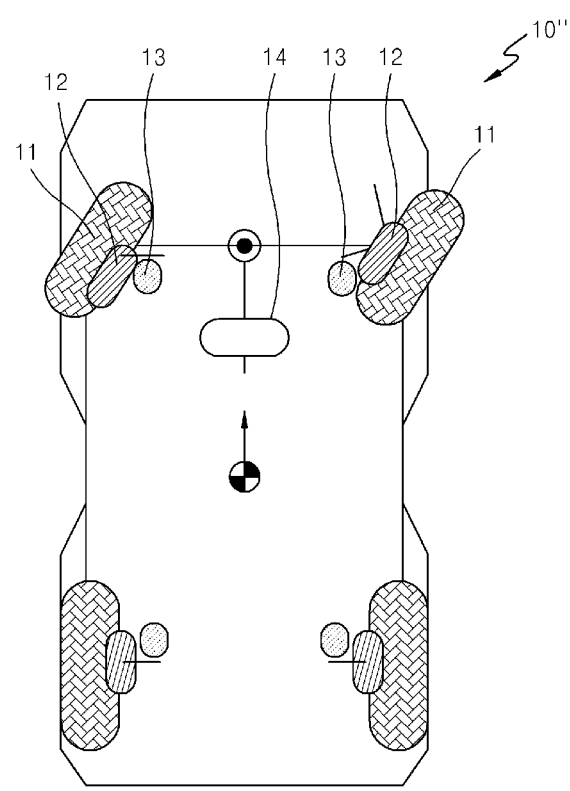
FIG. 20 is a bottom view illustrating a vehicle with independently driven multiple axes which has a 4-wheel structure, according to an exemplary embodiment.

In this case, the steering motor 14 may be linked to the wheels 11 in a way that varies according to a structure of the vehicle 10. As shown in FIG. 20, the steering motor 14 of a vehicle 10" with independently driven multiple axles which has a 4-wheel structure may adjust steering angles of front wheels.

Figure 19:
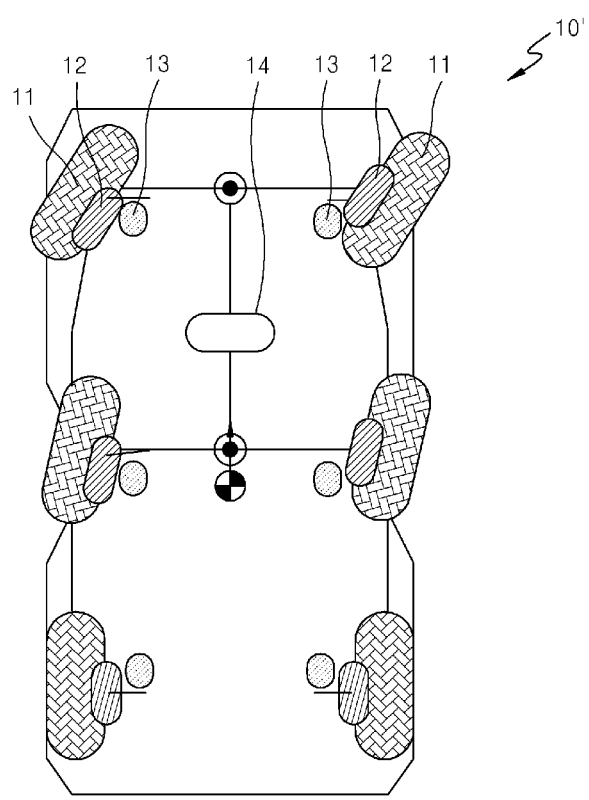
FIG. 19 is a bottom view illustrating a vehicle with independently driven multiple axes which has a 6-wheel structure, according to an exemplary embodiment.

In the vehicle 10 with independently driven multiple axles which has an 8-wheel structure illustrated in FIG. 1 and a vehicle 10' with independently driven multiple axes which has a 6-wheel structure illustrated in FIG. 19, the steering motor 14 may adjust steering angles of front wheels and middle wheels. In this case, a steering angle of each of the wheels 11 may be independently driven by a necessary amount. Accordingly, power loss for steering the vehicle 10 may be reduced and the steering motor 14 may be efficiently driven.

Meanwhile, a steering input may be received from a steering handle. An acceleration input may be received from an acceleration pedal. A braking input may be received from a brake pedal.

The in-wheel motor module 320 may include the in-wheel motors 12 of FIG. 1. Also, the braking module 330 may include the mechanical brakes 13 of FIG. 1.

The vehicle 10 may further include a measurement and state estimator 400. The measurement and state estimator 400 may measure or estimate an operation state of the operation module 300 by using a sensor or the like. To this end, various types of sensors may be mounted in the operation module 300.

The upper level controller 210 calculates and sets a target behavior of the vehicle 10 in response to the driver's operation input. Also, the upper level controller 210 may determine a control input applied to the lower level controller 220 in order to follow the target behavior.

In this case, the control input may be a target wheel speed of each of the wheels 11 for speed control, or a target yaw moment the vehicle 10 and a target longitudinal force of the vehicle 10 for torque control. Also, the control input may be a dual steering control input of wheel torque steering necessary for each of the wheels 11 and/or mechanical steering for complex steering.

The lower level controller 220 may perform tire force distribution required by each of the wheels 11 to reflect the control input determined by the upper level controller 210 on the vehicle 10, complex braking control for determining a braking amount of each of the mechanical brakes 13 which is to be hydraulically generated according to the amount of regenerative braking generated in the in-wheel motors 12, and wheel slip control for driving stability of the vehicle 10 when an excessive slip of each of the wheels 11 occurs.

The measurement and state estimator 400 may process measurement signals input from sensors, estimate states of variables necessary for control, and obtain information necessary for the upper level controller 210 and/or the lower controller 220.

The upper level controller 210 may determine a driving control program of the vehicle 10 according to a driving condition of the vehicle 10 as shown in Table 1. In this case, the driving condition may include a normal driving mode, a pivot turning mode, and a quick turning driving mode.

TABLE 1

| Driving Condition | Driving Control Program |
| --- | --- |
| Normal Driving Mode | Mechanical Steering, Complex Braking, Stability Control, Slip Control |
| Pivot Turning Mode | Complex Steering (not including Mechanical Steering) |
| Quick Turning Driving Mode | Complex Steering, Complex Braking, Stability Control, Slip Control |

In the normal driving mode, the vehicle 10 is controlled by a driving control program including at least one of mechanical steering, complex braking, stability control, and slip control. In the pivot turning mode, the vehicle 10 is controlled by a driving control program comprising complex steering which does not include mechanical steering.

In the quick turning driving mode, the vehicle 10 is controlled by a driving control program including at least one of complex steering, complex braking, stability control, and slip control.

Mechanical steering refers to a process by which steering angles of steering wheels linked to the steering motor 14 are adjusted by the steering motor 14. Complex steering may refer to a process by which control is achieved by a combination of mechanical steering and wheel torque steering of each of the wheels 11.

Normal driving refers to driving with a turning radius that is enough for mechanical steering. Accordingly, in the normal driving mode, additional steering control other than mechanical steering is unnecessary. Also, if deceleration occurs during driving, the amount of regenerative braking of the in-wheel motors 12 may be determined, and complex braking control for distributing a hydraulic braking force and a regenerative braking force may be performed.

The normal driving mode may include stability control of the vehicle 10 because high speed driving may occur. Also, the normal driving mode may include slip control for improving steering performance.

Pivot turning refers to a turning movement in one place without any longitudinal movement. In this case, only a yaw movement without any longitudinal speed is necessary. Accordingly, mechanical steering is excluded, and a yaw moment may be generated by distributing different torques to the wheels 11 by complex steering.

Quick turning driving is necessary for driving with a small turning radius that is not enough for mechanical steering. In this case, maximum turning performance may be achieved with mechanical steering, and a limitation of the mechanical steering may be overcome by distributing different wheel driving forces through complex steering to compensate for an additional moment.

The vehicle 10 may also be controlled by a steering control program including at least one of mechanical steering, stability control, wheel torque control, and wheel speed control according to a driving situation. For example, the steering control program may be divided into a first mode with a normal road high speed situation (more than 30 kph), a second mode with a normal road medium speed situation (10 kph to 30 kph), a third mode with a normal road low speed situation (5 kph to 10 kph) and a fourth mode with an off-road low speed situation (0 kph to 5 kph).

TABLE 2

| Driving Situation | Steering Control Program |
| --- | --- |
| Normal Road High Speed Situation | Mechanical Steering + Stability Control (DYC) |
| Normal Road Medium Speed Situation | Mechanical Steering + Wheel Torque Control |
| Normal Road Low Speed Situation | Mechanical Steering + (Outer Wheel) Wheel Torque Control |
| Off-road Low Speed Situation | Wheel Speed Control |

In Table 2, a road situation is divided into a normal road and an off-road, and a speed condition is divided into high speed, medium speed, and low speed. In this case, the high speed is more than 30 km, the medium speed ranges from 10 km to 30 km, the low speed ranges from 5 km to 10 km, and the off-road low speed is less than 5 km.

In this case, a limit of a mechanical steering angle is 10 degrees, and a target yaw moment is generated by complex steering control when a steering angle greater than 10 degrees is required by the driver. In a low speed situation, a target value may be achieved by wheel speed control. This is because, in an off-road low speed situation, wheel speed control is more effective than wheel torque control.

In a medium speed situation, while a target yaw moment is achieved by wheel torque control, speed control may also be performed according to a state of a wheel, in order to prevent a slip ratio from diverging in a wheel having a large slip angle. In a high speed situation, since control is achieved for stability rather than complex steering in normal driving (with a steering angle of less than 10 degrees), stability of the vehicle 10 may be assured.

Here, in a normal road high speed situation, a steering control program may be worked out by direct yaw control (DYC) and mechanical steering. Also, in a normal road medium speed situation, a steering control program may be worked out by wheel torque control and mechanical steering.

In a normal road low speed situation, a steering control program may be worked out by a combination of wheel speed control, wheel torque control, and mechanical steering. In this case, during a rotation, outer wheels may be steered by wheel torque control, and inner wheels may be steered by wheel speed control. In an off-road low speed situation, both inner and outer wheels may be steered by wheel speed control without mechanical steering.

Figure 3:
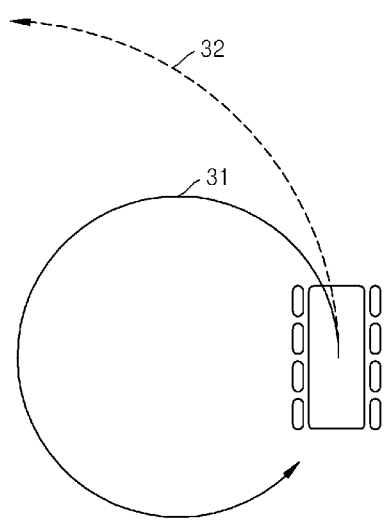
FIG. 3 is a schematic view illustrating a result obtained by simulating turning when only mechanical steering is used and when complex steering is used in the vehicle of FIG. 1, according to an exemplary embodiment.

FIG. 3 is a schematic view illustrating a result obtained by simulating turning in a case 32 where only mechanical steering is used, and in a case 31 where complex steering is used in the vehicle 10 of FIG. 1.

In the case 31 using complex steering, a yaw moment may be generated by applying different torque inputs to left and right wheels so that turning beyond a maximum range possible with just mechanical steering may be achieved.

Complex steering control may be determined in a mode that varies according to a speed and a driving situation. In an off-road low speed driving situation, a target yaw moment may be achieved by wheel speed control. In a normal road medium speed driving situation, both torque control and speed control may be performed according to a state of a wheel. In this case, the reason why both torque control and speed control are performed together is to prevent a slip ratio generated by the torque control from diverging.

Figure 4:
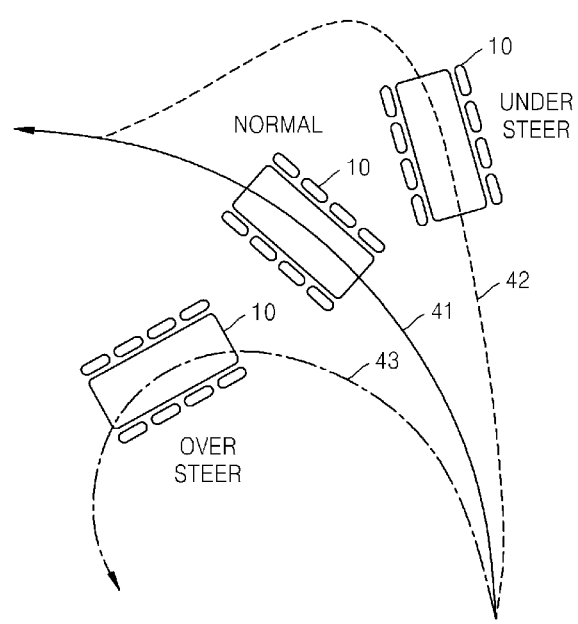
FIG. 4 is a schematic view illustrating stability of the vehicle of FIG. 1 achieved by wheel torque control during high speed driving on a general road, according to an exemplary embodiment.

As shown in FIG. 4, if high speed driving is performed on a normal road, stability of the vehicle 10 is improved due to wheel torque control.

Understeer 42 or oversteer 43 may be prevented from occurring by performing wheel torque control in a normal high speed driving situation to distribute torques applied to the wheels 11 as shown in a case 41.

Figure 5:
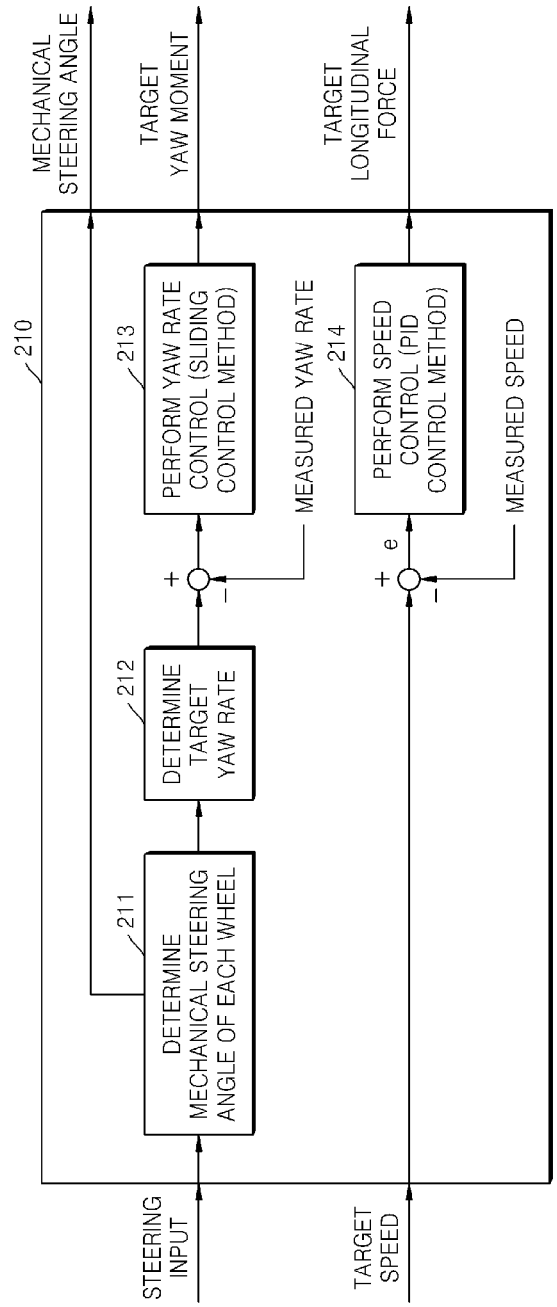
FIG. 5 is a block diagram illustrating a control structure of an upper level controller based on a wheel torque control program in the vehicle of FIG. 1, according to an exemplary embodiment.
Figure 6:
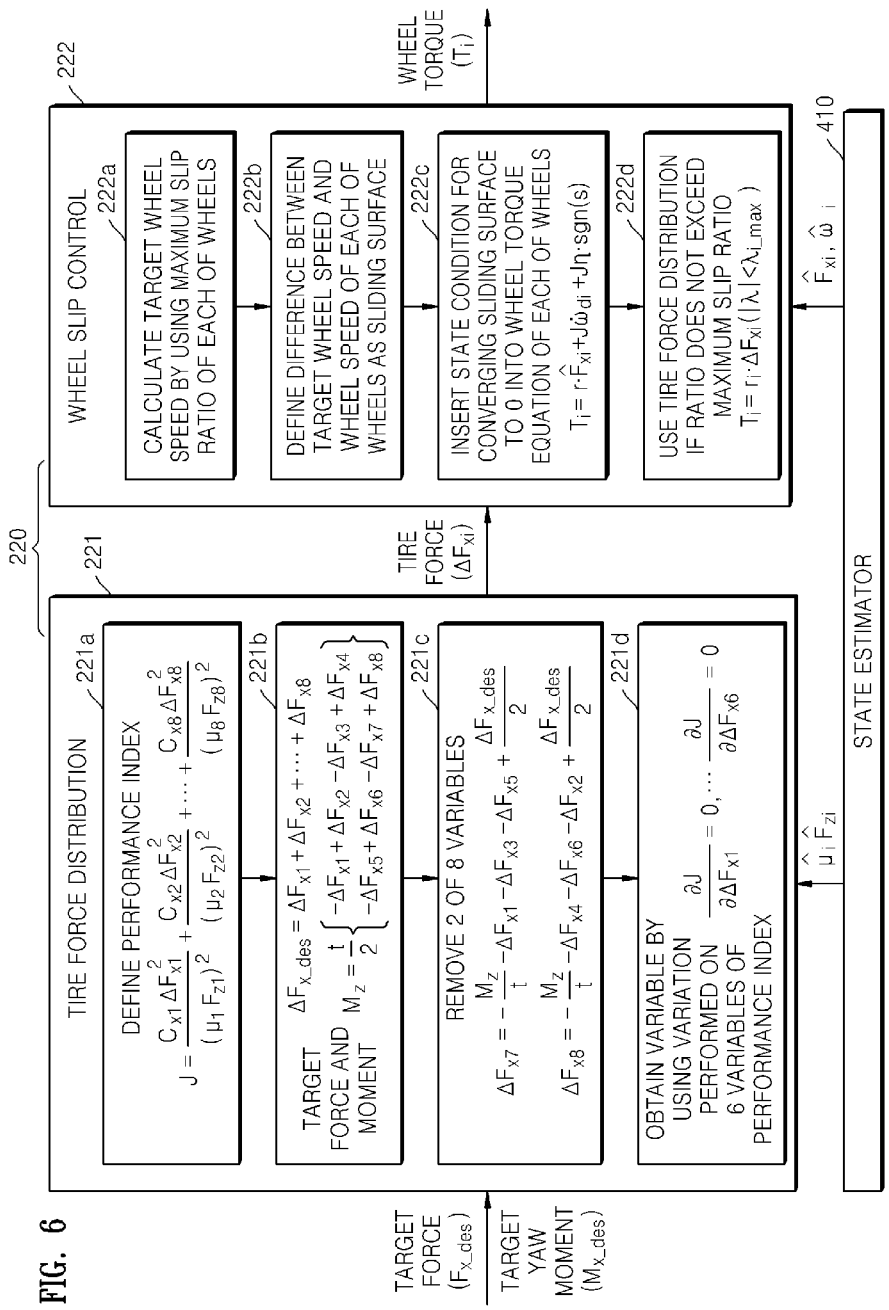
FIG. 6 is a schematic view illustrating a control structure of a lower level controller based on the wheel torque control program in the vehicle of FIG. 1, according to an exemplary embodiment.

FIGS. 5 and 6 are block diagrams illustrating control structures of the upper level controller 210 and the lower level controller 220 for wheel torque control in the vehicle 10 of FIG. 1.

For wheel torque control, a target speed and a target yaw rate may be determined by the driver's steering input and acceleration and/or braking inputs. If the target speed and the target yaw rate are determined, a target longitudinal force and a target yaw moment determined by a total longitudinal driving force and/or a braking force of the vehicle 10 for achieving the target speed and the target yaw rate may be determined.

In this case, driving forces are distributed to the wheels 11 in consideration of a driving situation in order to achieve the determined target values, and outputs from the in-wheel motors 12 may be determined by controlling a slip ratio or the like.

Referring to FIGS. 5 and 6, for wheel torque control, the upper level controller 210 may receive a steering input and a target speed of the vehicle 10, and may determine a mechanical steering angle of each of the wheels 11, and a target yaw moment and a target longitudinal force of the vehicle 10.

In this case, a steering angle determiner 211 may determine the mechanical steering angle of each of the wheels 11 from the steering input. A yaw rate determiner 212 may determine a target yaw rate in consideration of time delay from the mechanical steering angle. A yaw speed controller 213 may determine a target yaw moment by feeding back a measured yaw rate of the vehicle 10 to the target yaw rate to perform yaw rate control.

In a speed controller 214, the target longitudinal force may be determined by a proportional integral derivative (PID) control method in which a difference between a target speed and a measured speed is calculated as an error, and proportional, integral and derivative gains are multiplied by the error.

The upper level controller 210 receives the target speed determined by the driver's steering input and a driving/braking input, and determines the target longitudinal force determined by a longitudinal driving force and/or a braking force, the target yaw moment, and 1-wheel and 2-wheel steering angles in FIG. 1.

The upper level controller 210 determines the 1-wheel and 2-wheel steering angles according to the driver's steering input in consideration of physical characteristics of the vehicle 10. A static target yaw rate may be determined based on a static bicycle model that is a simple linear model due to the determined steering angles.

The target yaw rate may be determined in response to the driver's steering input in consideration of kinetic characteristics of a 4-wheel, 6-wheel, or 8-wheel vehicle. In this case, the static target yaw rate may vary depending on the type of vehicle 10 or the number of axles, and may be determined by the driver's steering input and a speed of the vehicle 10. The static bicycle model may be expandable or contractable according to the type of vehicle 10 or the number of the axles.

The target yaw rate according to the driver's steering may be calculated by using a static kinetic model without considering a change in time. Since the yaw rate is controlled by the yaw speed controller 213, the target yaw moment necessary for the entire vehicle 10 may be determined in order to remove a difference between a target yaw rate determined by a speed of the vehicle 10 and the driver's steering input and a measured yaw rate of the actual vehicle 10.

In the yaw speed controller 213, the target yaw moment may be determined by using a sliding control method. A sliding surface may be defined as a difference between the target yaw rate and the measured yaw rate of the vehicle 10. A target yaw moment input value may vary according to a type of the vehicle 10.

A static target yaw rate is determined as the target yaw rate by using a linear time delay function due to kinetic characteristics of the vehicle 10. This is because there is a time delay in a response of the vehicle 10 to the driver's steering input.

The total target yaw moment of the vehicle 10 may be determined by the sliding control method in which a sliding surface determined from a difference between a measured yaw rate of the vehicle 10 and a target yaw rate is converged to 0 by enabling a differential coefficient of the sliding surface relative to time to always have a sign (+ or −) opposite to that of the sliding surface.

Also, the total target longitudinal force of the vehicle 10 may be determined by using a PID control method in which a difference between a target speed and a measured speed is calculated as an error, and proportional, integral and derivative gains are multiplied by the error.

Meanwhile, for wheel torque control, the lower level controller 220 may determine a tire force of each of the wheels 10 by receiving a target longitudinal force and a target yaw moment, and distributing the target longitudinal force and the target yaw moment as a force to be exerted at the bottom of a tire of each of the wheels 11, and may determine a wheel torque by using wheel slip control from the tire force of each of the wheels 11.

In this case, the target yaw moment may vary according to the type of vehicle 10 in consideration of characteristics of the vehicle 10. That is, the vehicle 10 may be any one of 4-wheel, 6-wheel, and 8-wheel vehicles as shown in FIGS. 1, 19, and 20, and the target yaw moment may be determined by a relationship that varies according to the type of vehicle 10.

The lower level controller 220 may include a tire force distributor 221 and a wheel slip controller 222. The tire force distributor 221 determines a tire force of each of the wheels 11 by receiving a target longitudinal force and a target yaw moment, and distributing the target longitudinal force and the target yaw moment as a force necessary for a tire of each of the wheels 11. The wheel slip controller 222 may determine a wheel torque by using wheel slip control from the tire force of each of the wheels 11.

In this case, the tire force distributor 221 may determine a friction circle 70 (see FIG. 7) from a maximum force that may be generated in each of the wheels 11 according to a driving situation, and may determine a tire force proportional to a size of the friction circle for each of the wheels 11. In this case, the tire force of each of the wheels 11 may be determined by using optimal distribution using a performance index proportional to the size of the friction circle.

Also, the performance index proportional to the size of the friction circle may be obtained when a friction force of each of the wheels 11 is estimated and input by a state estimator 410. The state estimator 410 may be included in the measurement and state estimator 400.

Figure 7:
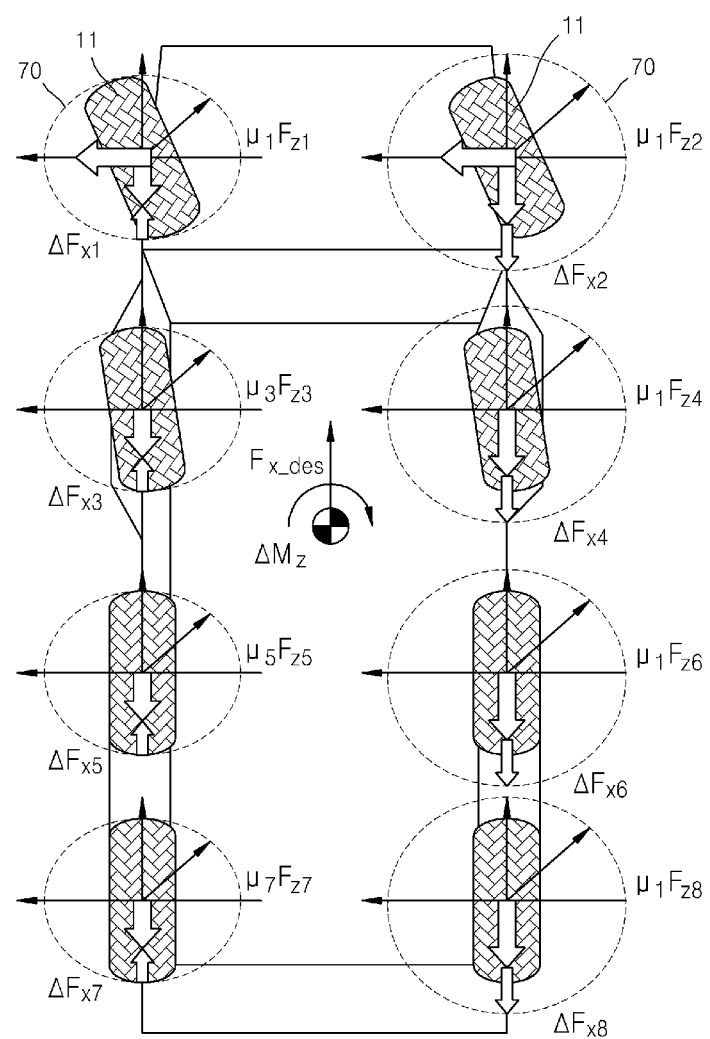
FIG. 7 is a schematic view for explaining a wheel torque distribution program in which a maximum force generated by each of wheels is determined according to a size of a friction circle during wheel torque control, according to an exemplary embodiment.

Meanwhile, FIG. 7 is a schematic view for explaining a wheel torque distribution program in which a maximum force generated by each of the wheels 11 is determined according to a size of the friction circle 7 during wheel torque control.

In the case of 8-wheel vehicle, the tire force distributor 221 defines performance index (221a), and target force and moment (221b), removes 2 of 8 variables (221c), and obtains variables by using variation performed on 6 variables of performance index (221d).

In the wheel torque distribution program, the maximum force which may be generated in each of the wheels 11 according to a driving situation may be determined according to the size of the friction circle 70. In this case, since as the size of the friction circle increases, a greater force is generated, a greater force may be allocated. As the size of the friction circle decreases, a smaller force may be allocated.

A tire force of each of the wheels 11 may be determined by distribution of a force necessary for a tire of each of the wheels 11 in proportion to a size of each of the friction circles 70. Also, a torque to be output from the in-wheel motors 12 may be determined such that a slip is prevented from diverging in consideration of a wheel slip state.

Meanwhile, the wheel slip controller 222 may calculate a target wheel speed by reflecting a slip ratio of each of the wheels 11 in operation 222a, define a difference between the target wheel speed and a wheel speed of each of the wheels 11 as a sliding surface in operation 222b, and determine a wheel torque by inserting a state condition for converging the sliding surface to 0 into a wheel torque equation of each of the wheels 11 in operation 222c.

In this case, if a slip ratio obtained by using the sliding surface does not exceed a maximum slip ratio, a wheel torque may be directly determined from the tire force determined by the tire force distributor 221 in operation 222d. In this case, a tire force and a wheel speed of each of the wheels 11 may be estimated and input by the state estimator 410.

Figure 8:
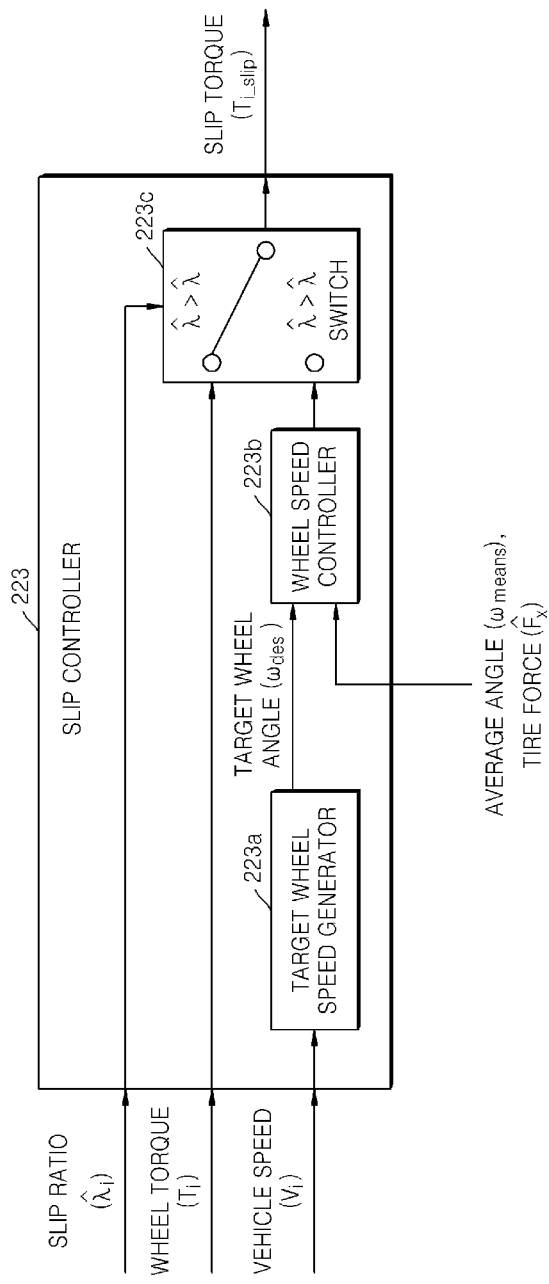
FIG. 8 is a block diagram illustrating a slip controller in regard to a slip control program of each of the wheels during wheel torque control, according to an exemplary embodiment.

FIG. 8 is a block diagram illustrating a slip controller 223 in a slip control program of each of the wheels for wheel torque control. The slip controller 223 includes a target wheel speed generator 223a, a wheel speed controller 223b, and a switch 223c.

The target wheel speed generator 223a receives a vehicle speed and generates a target wheel angular speed. The wheel speed controller 223b receives an average angular speed and a tire force by feedback with respect to the target wheel angular speed, and generates a slip torque.

The switch 223c determines a wheel torque as a slip torque if a slip ratio is equal to or less than a maximum slip ratio, and outputs the slip torque generated by the wheel speed controller 223b if a slip ratio is higher than the maximum slip ratio.

That is, if a slip of a wheel occurs within a maximum wheel slip region, slip control is not performed. However, if a slip of a wheel occurs outside the maximum wheel slip region, the slip controller 223 determines a target wheel speed and determines an input torque value for achieving the target wheel speed. A sliding surface may be defined as a difference in wheel speed.

A target wheel speed when a slip of a wheel occurs outside the maximum wheel slip region may be determined by a preset relational expression. In this case, a driving situation may be divided into an acceleration situation and a deceleration situation. In this case, although a maximum wheel slip may be 0.2, the present exemplary embodiment is not limited thereto, and a maximum wheel slip may vary according to a road situation.

Figure 9:
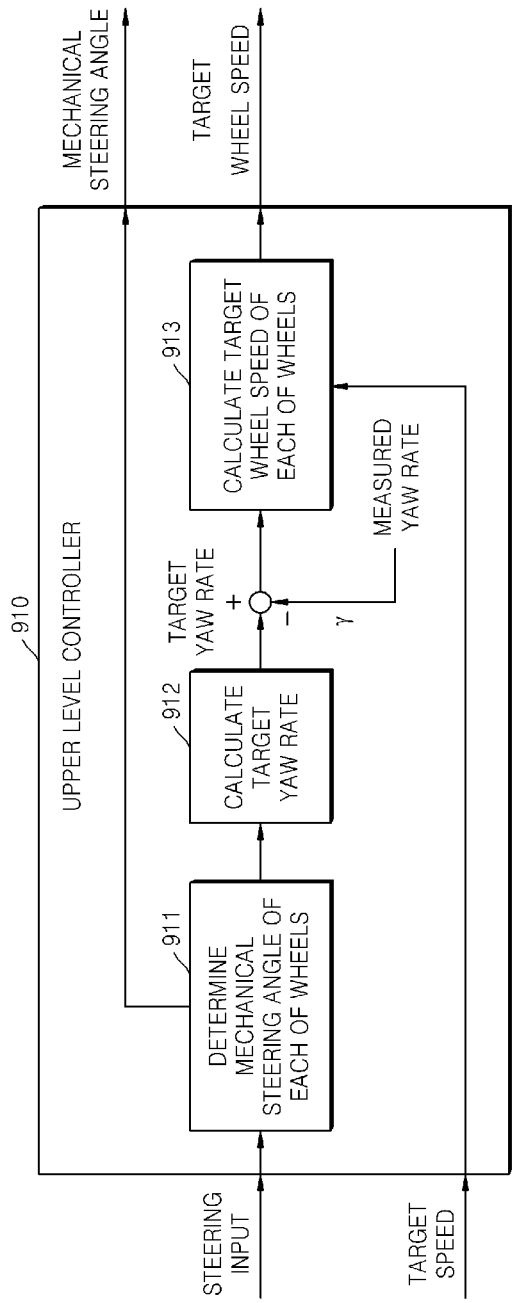
FIG. 9 is a block diagram illustrating a control structure of an upper level controller based on a wheel speed control program in the vehicle of FIG. 1, according to an exemplary embodiment.
Figure 10:
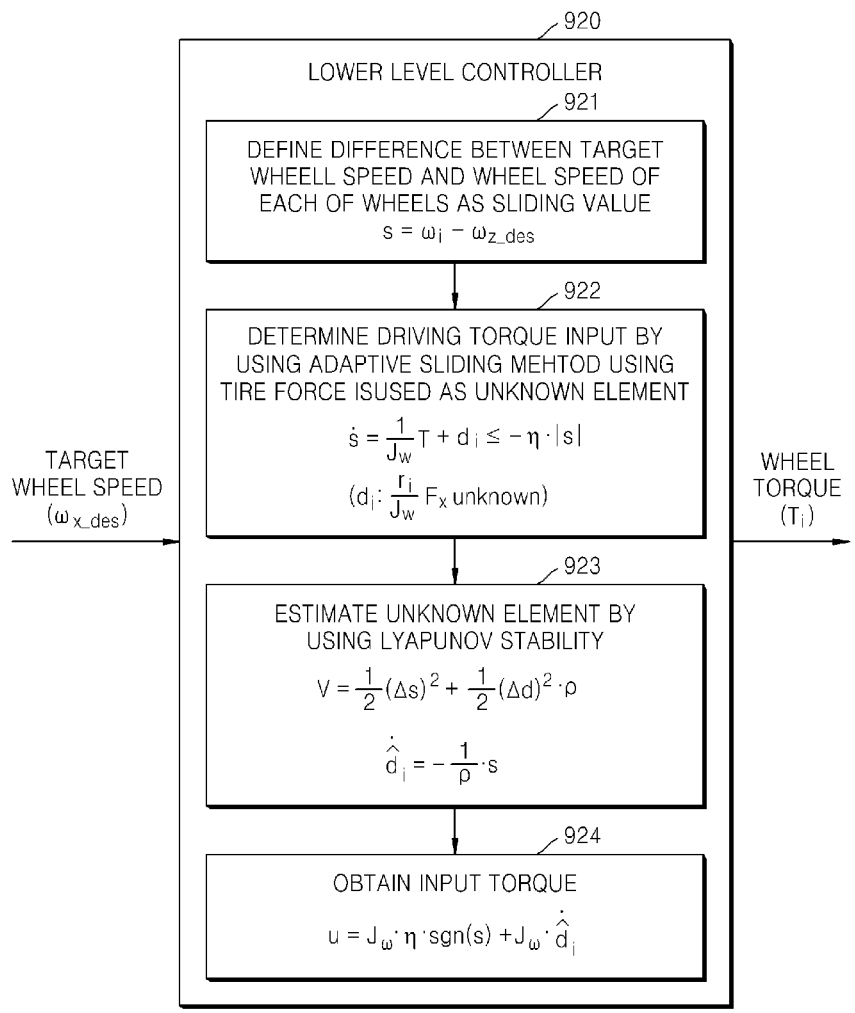
FIG. 10 is a block diagram illustrating a control structure of a lower level controller based on the wheel speed control program in the vehicle of FIG. 1, according to an exemplary embodiment.

FIG. 9 is a block diagram illustrating a control structure of an upper level controller 910 for wheel speed control in the vehicle 10 of FIG. 1, according to an exemplary embodiment. FIG. 10 is a block diagram illustrating a control structure of a lower level controller 920 for the wheel speed control in the vehicle 10 of FIG. 1, according to an exemplary embodiment.

Wheel speed control may be used in order to assure stability more effectively than wheel torque control in an off-road low speed situation of the vehicle 10. Wheel speed control may be suitable for a driving situation in which fast and sharp control is not necessary, such as in a low speed situation, may use a control algorithm with a lesser amount of calculation than torque control, such as in an off-road low speed situation, and has strong resistance against wheel slip divergence.

To this end, a target speed of the vehicle 10 may be determined based on a throttle input and the driver's steering input, a target wheel speed of each of the wheels 11 for achieving the target speed of the vehicle 10 may be calculated, and a wheel torque of each of the wheels 11 may be determined from the target wheel speed.

For wheel speed control, the upper level controller 910 receives a steering input and a target speed, and determines a mechanical steering angle of each of the wheels 11 and a target wheel speed of each of the wheels 11.

Here, a steering angle determiner 911 may determine a mechanical steering angle of each of the wheels 11 from the steering input. A yaw rate determiner 912 may determine a target yaw rate from the mechanical steering angle in consideration of a time delay. A wheel speed determiner 913 may determine a target wheel speed by adding a wheel speed due to feedforward control and a wheel speed due to feedback control using a difference between the target yaw rate and a measured yaw rate of the vehicle 10.

Here, the mechanical steering angle of each of the wheels 11 may be calculated by using the driver's steering input in the same manner as in the wheel torque control. Also, the target yaw rate may be calculated from the mechanical steering angle, and the target wheel speed of each of the wheels 11 may be calculated from the target yaw rate and a target longitudinal speed.

The target wheel speed of each of the wheels 11 may be obtained by adding a wheel speed due to feedforward control and a wheel speed due to feedback control using a difference between the target yaw rate and a measured yaw rate.

The feedforward control may be determined by the target longitudinal speed and the target yaw rate due to mechanical characteristics of the vehicle 10. The feedback control is used when the feedforward control determined by the mechanical characteristics of the vehicle 10 does not achieve target values due to a slip.

A sliding determiner 921 may determine a difference between the target wheel speed and a wheel speed of each of the wheels 11 as a sliding surface, a driving torque determiner 922 may determine a driving torque input by using an adaptive sliding method using a tire force of each of the wheels 11 as an unknown element, and input torque determiners 923 and 924 may determine the wheel torque by estimating the unknown element by using Lyapunov stability.

Meanwhile, since a driving load which is generated by the effect of a road and a gradient may not be measured, a controller in consideration of the driving load needs to be designed. A control input may be determined by defining a driving load as an unknown quantity by using an adaptive sliding control method.

A difference between a target wheel speed of each of the wheels 11 and a wheel speed of each of the wheels 11 calculated by the upper level controller 910 may be defined as a sliding surface in the sliding determiner 921. A wheel torque input may be determined by using an adaptive sliding method in which a longitudinal tire force (that is, a driving load) of each of the wheels 11 is an unknown element in the driving determiner 922. In this case, the unknown element may be estimated by using Lyapunov stability, and an input wheel torque may be obtained by inserting the estimated element into the unknown element in a sliding control method in the input torque determiners 923 and 924.

Figure 11A:
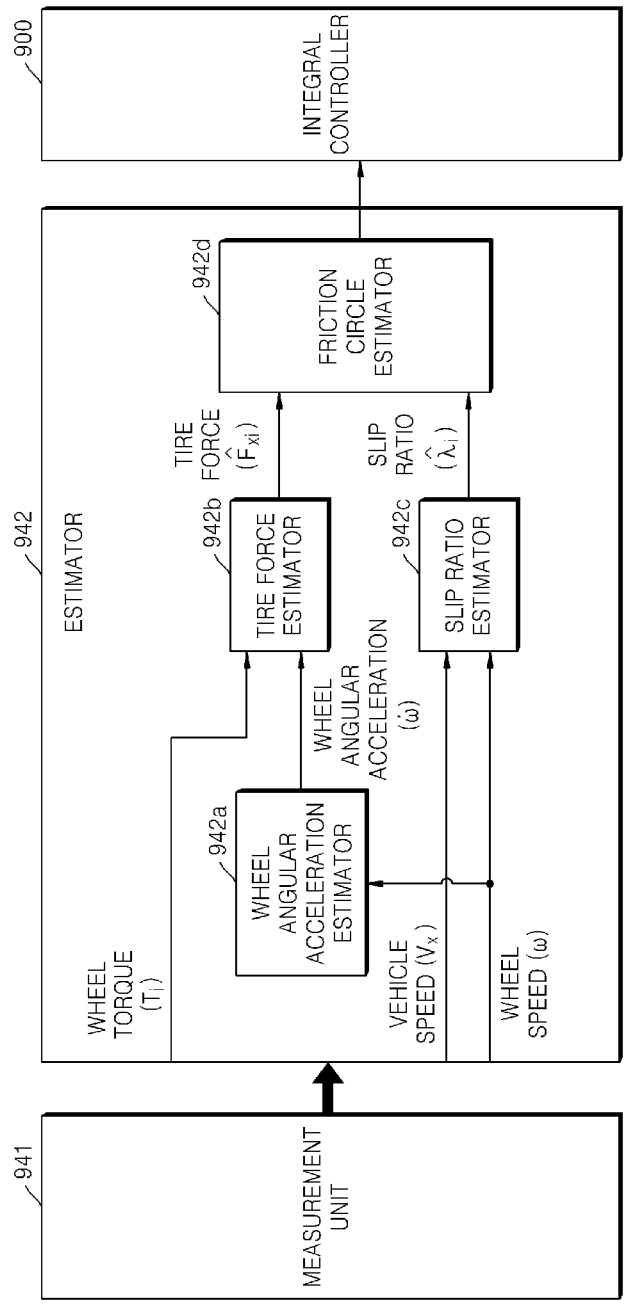
FIG. 11A is a block diagram illustrating a structure of an estimator for estimating a size of a friction circle in the vehicle of FIG. 1, according to an exemplary embodiment.

FIG. 11A is a block diagram illustrating a structure of an estimator 942 for estimating a size of a friction circle in the vehicle 10 of FIG. 1, according to an exemplary embodiment.

The measurement and state estimator 400 illustrated in FIG. 2 may include a measurement unit 941 and the estimator 942. State estimated values estimated by the estimator 942 may be input to an integral controller 900 corresponding to a combination of the upper level controller 910 and the lower level controller 920 or at least a part of the combination, and may be used for wheel torque control and/or speed control.

The measurement unit 941 may include a global position system (GPS)/inertia navigation sensor (INS) for measuring a longitudinal vehicle speed, a wheel speed sensor for measuring a wheel speed, and a torque sensor for measuring a wheel torque input.

The estimator 942 may include a wheel angular acceleration estimator 942a, a tire force estimator 942b, a slip ratio estimator 942c, and a friction circle estimator 942d. The wheel angular acceleration estimator 942a may be configured to estimate a wheel angular acceleration from a wheel speed measured by the wheel speed sensor of the vehicle 10 by using Kalman filtering.

The tire force estimator 942b may be configured to estimate a tire force by using the wheel angular acceleration and a wheel torque measured by the in-wheel motors 12 of the vehicle 10. In this case, the wheel torque may be measured by sensors in the in-wheel motors 12, and the wheel angular acceleration may be estimated from the wheel speed measured by the wheel speed sensor attached to the vehicle 10 by using Kalman filtering.

The slip ratio estimator 942c may be configured to estimate a slip ratio from the wheel speed measured by the wheel speed sensor and a vehicle speed measured from the GPS/INS. The vehicle speed may be a longitudinal speed of the vehicle 10. In this case, the slip ratio may be separately estimated in deceleration and acceleration driving situations. Accordingly, an equation for determining the slip ratio may be divided according to the deceleration and acceleration driving situations.

The friction circle estimator 942d may be configured to estimate a friction circle by using the slip ratio and the estimated tire force, which may be a longitudinal tire force.

The friction circle may be defined based on a gradient of a graph illustrating a relationship between the slip ratio and the tire force in a driving situation of a static load state on a normal road having high friction. In this case, the static load refers to a load applied to each of the wheels 11 in a state where the vehicle 10 is stopped.

The fire force may be applied in a current driving situation, and a size of the friction circle may be estimated by using a change in the gradient of the graph of the tire force and the slip ratio formed by a slip ratio measured in this state. A size of a current friction circle may be estimated by using a formula that a ratio between a reference gradient and a current gradient is equal to a ratio between a size of a friction circle in a static state and a size of a current friction circle.

Figure 11B:
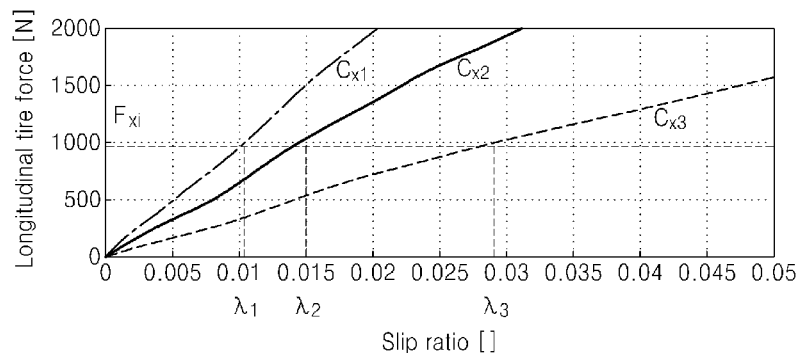
FIG. 11B is a graph explaining a principle of estimating friction circle, which is related to operation of friction circle estimator.

FIG. 11B is a graph explaining a principle of estimating a friction circle, which is related to an operation of a friction circle estimator.

As shown in FIG. 11B, a size of friction circle is proportional to longitudinal tire stiffness in a constant range of slip ratio. Even when the longitudinal force is applied to a tire, a slip ratio becomes changed due to the size of friction circle of each wheel. Therefore, using this principle, the size of friction circle can be determined by a known longitudinal tire force and an estimated slip ratio.

| Tractive/braking stiffness | |
|---|---|
| $muFz = 7000\ [N],\ C_{x1} = \frac{F_{xi}}{\lambda_1} = \frac{1000[N]}{0.0105} = 95238.1\ [N]$ | |
| $muFz = 4800\ [N],\ C_{x2} = \frac{F_{xi}}{\lambda_2} = \frac{1000[N]}{0.015} = 66666.7\ [N]$ | |
| $myFz = 2500\ [N],\ C_{x3} = \frac{F_{xi}}{\lambda_3} = \frac{1000[N]}{0.030} = 33333.4\ [N]$ | |

A linear parameter K for friction circle and longitudinal tire stiffness can be determined by a value of friction coefficient and normal force, which can be calculated in a stopped state. Under this stopped state, when applying tire force within a linear area and measuring slip ratio, the linear parameter can be determined a formula as below.

$$\hat{\mu}\hat{F}_z = K \cdot C_{xi}\left(\text{where, } K = \mu_{i\_static}F_{zi\_static} \cdot \frac{\lambda_{i\_linear}}{F_{xi\_linear}}\right)$$

This friction circle estimating method uses the linear parameter K which is for a friction circle and longitudinal tire stiffness in order to estimate a size of friction circle. But, estimation performance of the friction circle estimating method can be deteriorated when a relationship between a slip ratio and a longitudinal tire force becomes changed rapidly and continuously based on changes of a driving condition or a surface of road.

Figure 11C:
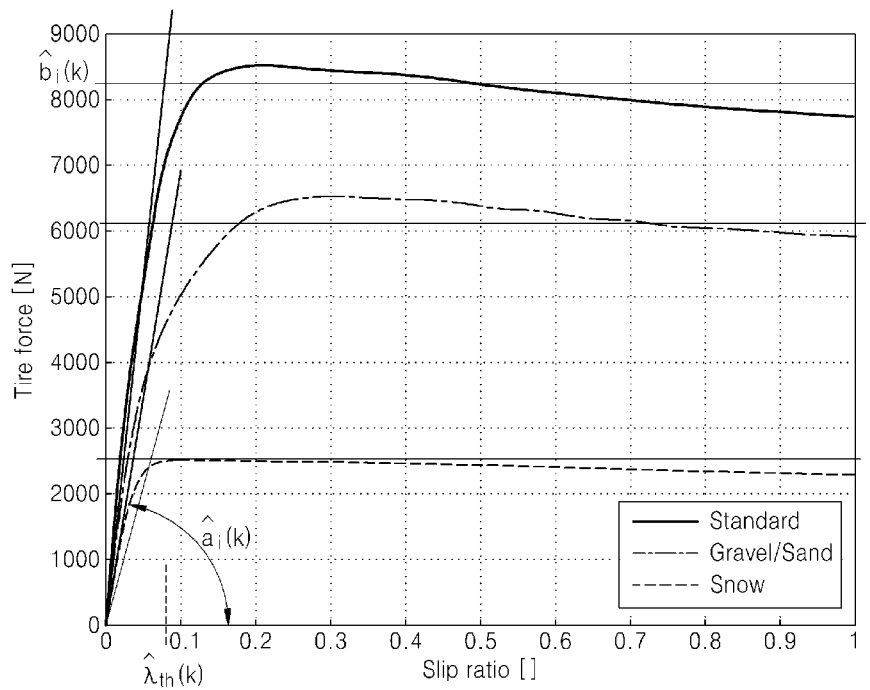
FIG. 11C is a graph representing a relationship between slip ratio and longitudinal tire force, which is related to operation of friction circle estimator.
Figure 11D:
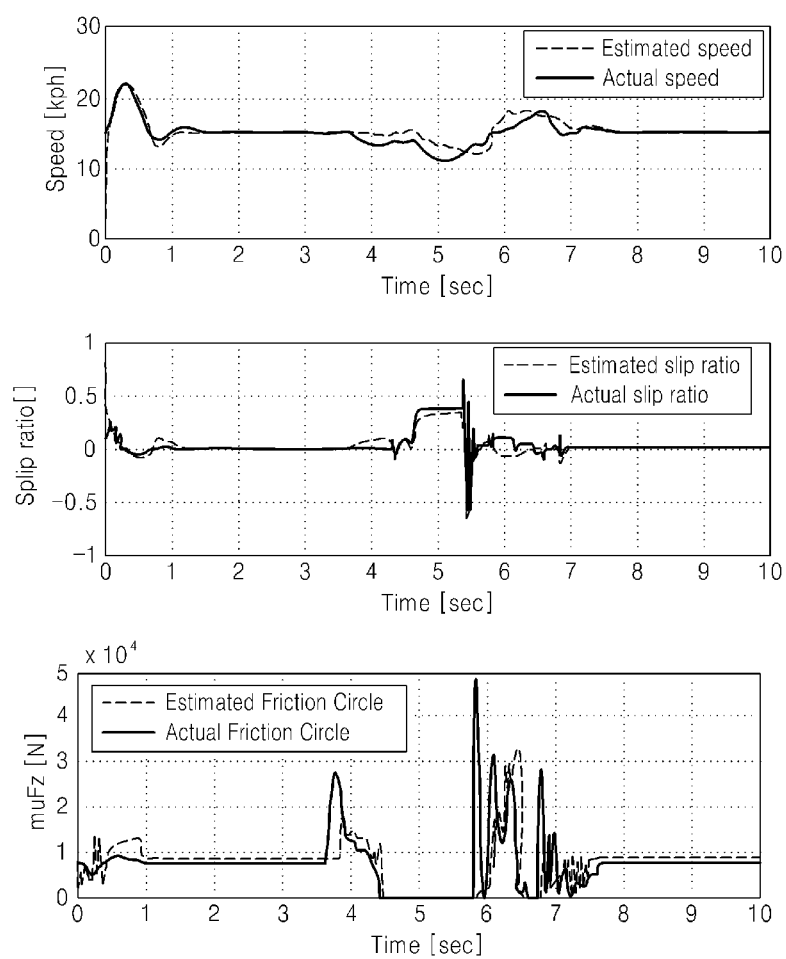
FIG. 11D is graphs showing results of simulation using friction circle estimator of FIG. 11B.

FIG. 11C is a graph representing a relationship between a slip ratio and a longitudinal tire force, which is related to an operation of a friction circle estimator, and FIG. 11D is graphs showing results of simulation using a friction circle estimator of FIG. 11B.

As shown in FIG. 11C, the relationship between a slip ratio and a longitudinal tire force becomes changed variously due to changes of a driving condition or a surface of road. The change of the relationship between a slip ratio and a longitudinal tire force can proceed rapidly and continuously on time bases, In this exemplary method of estimating a friction circle, estimation of a friction circle can be compensated using a RLS (Recursive Least Square) Method.

The relationship between a slip ratio and a longitudinal tire force can be approximated to a function of a linear relationship $\hat{a}_i$ and a constant $\hat{b}_i$, which is represented by equation (1) below. By setting a difference between a value of this approximated function and an estimated value of tire force into an indexing value, a linear relation can be obtained for minimizing the indexing value (equation (2)).

$$\hat{f}_i(k) = \begin{cases} \hat{a}_i(k) \cdot \hat{\lambda}_i(k) & (\hat{\lambda}_i(k) \le \hat{\lambda}_{th}(k)) \\ \hat{b}_i(k) & (\hat{\lambda}_i(k) > \hat{\lambda}_{th}(k)) \end{cases} \quad (1)$$

$$J_{RLS,i}(k) = \sum_{k-N}^{k}\{\hat{f}_i(k) - \hat{F}_{xi}(k)\}^2,\ \frac{\partial J_{RLS,i}(k)}{\partial \hat{\lambda}_i(k)} = 0 \quad (2)$$

The linear relationship for minimizing the indexing value can be obtained by an equation (3) below.

$$\hat{a}_i(k) = \hat{a}_i(k-1) + L(k)\{\hat{f}_i(k) - \hat{a}_i(k-1) \cdot \hat{\lambda}_i(k)\} \quad (3)$$

$$\text{where, } L(k) = P(k-1)\hat{\lambda}_i(k)\{\eta + P(k-1)\hat{\lambda}_i^2(k)\}^{-1},$$

-continued $$P(k) = \{1 - L(k)\hat{\lambda}_i(k)\}P(k-1) \cdot \frac{1}{\eta}$$

Also, an estimation value for a friction circle can be updated according to a change of a linear relationship which is represented by equation (4) below.

$$(\mu F_z)_{est}(k) = \qquad (4)$$

$$\begin{cases} (\mu F_z)_{nominal} \cdot \frac{1}{a_{i(nominal)}} \cdot \hat{a}_i(k) & (0.01 \leq |\hat{\lambda}_i(k)| \leq \hat{\lambda}_{th}(k)) \\ (\mu F_z)_{est}(k-1)(\text{no update}) & (|\hat{\lambda}_i(k)| < 0.01 \text{ or } |\hat{\lambda}_i(k)| > \hat{\lambda}_{th}(k)) \end{cases}$$

Figure 11E:
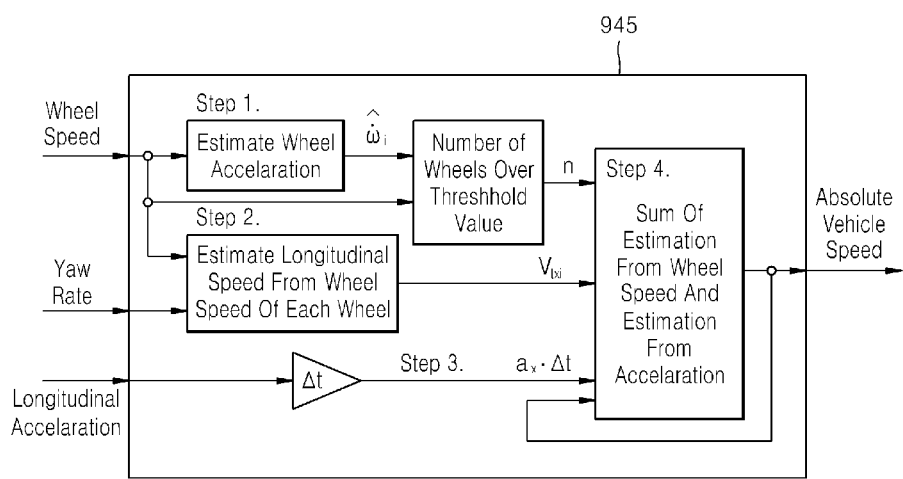
FIG. 11E is a block diagram illustrating a structure of a wheel speed estimator for estimating wheel speed in the vehicle of FIG. 1, according to an exemplary embodiment.

FIG. 11E is a block diagram illustrating a structure of a wheel speed estimator for estimating wheel speed in the vehicle of FIG. 1, according to an exemplary embodiment.

The measurement and state estimator 400 illustrated in FIG. 2 may include a vehicle speed estimator 945 as shown in FIG. 11E.

The vehicle speed estimator 945 of FIG. 11E receives data related to wheel speed of each wheel, longitudinal acceleration of a vehicle, and a yaw rate by receiving electric signals from each physical value sensor, directly or through communication. Then, the vehicle speed estimator 945 estimates vehicle speed with steps as explained below.

Step 1. Estimate wheel angular acceleration from wheel angular speed.

Step 2. Estimate vehicle speed using each wheel speed and a vehicle yaw rate. In Step 2, a wheel with higher wheel angular acceleration is excluded based on the result of Step 1.

Step 3. Estimate vehicle speed from longitudinal vehicle acceleration.

Step. 4. Estimate a resultant vehicle speed by summing vehicle speed of Step. 2, the number of wheels with higher wheel angular acceleration of Step. 1, and estimated vehicle speed from longitudinal vehicle acceleration in Step 3.

Steps 1 to 4 are shown in table 3.

TABLE 3

| Estimation of wheel acceleration | Count number of wheels with wheel angular acceleration over threshold value | Sum of estimation from wheel speed and estimation from acceleration |
|---|---|---|
| Estimate wheel acceleration using wheel speed sensor (Using Kalman Filter) | Count number N of wheels having value higher than average value of 6 wheels | Estimate by summing estimated longitudinal speed based on wheel speed and estimated longitudinal speed based longitudinal acceleration (N wheel with weighted value) |

In a related art estimation algorithm for estimating vehicle speed of a vehicle with a non-drive wheel (free wheel), parameters for vehicle speed estimation algorithm are determined through driving tests on various driving conditions and road surfaces based on rotating wheel speed of non-drive wheel.

In a case of four wheel drive vehicle, all wheels can have slips. Therefore, vehicle speed needs to be estimated by using longitudinal acceleration sensors installed on vehicle.

Although vehicle speed can be obtained by using a GPS (Global Positioning System), data updating speed is too slow. Additionally, a sensor assembly integrated with a GPS and an IMU (Inertial Measurement Unit) is too expensive to be adapted to commercial vehicles. It is also difficult to apply a GPS to vehicles with independently driven multiple axles and a skid steering mechanism.

If a vehicle estimation algorithm of a vehicle speed estimator shown in FIG. 11E is applied to a vehicle, the performance of vehicle speed estimation can be improved greatly without increasing cost.

Figure 11F:
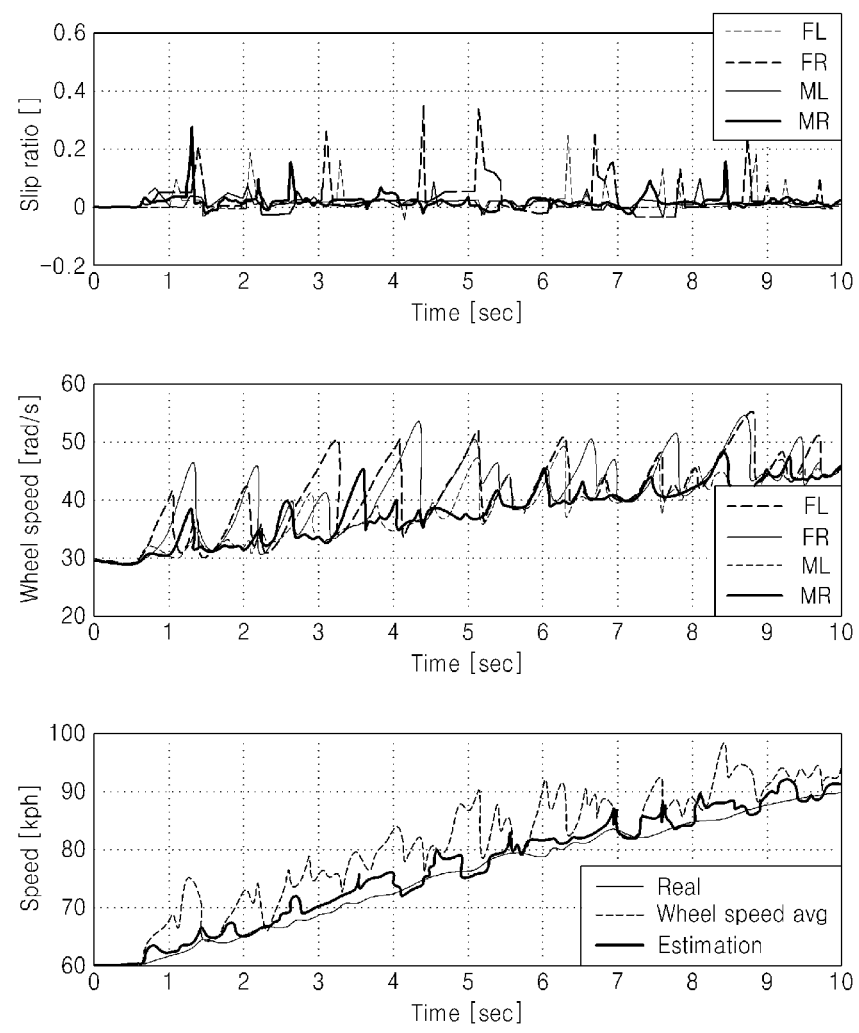
FIG. 11F is graphs showing results of simulation using wheel speed estimator of FIG. 11E.

FIG. 11F is graphs showing results of simulation using the wheel speed estimator of FIG. 11E.

FIG. 11F shows results of using a vehicle speed estimator FIG. 11E under a condition that a vehicle accelerates from 60 KPH (Kilometer per hour) to 100 KPH on an off-road like road. Graphs of FIG. 11F represent greatly improved performance of vehicle estimation for a vehicle with independently driven multiple axles and a skid steering mechanism under a condition that average wheel speed increases due to excessive generation of slippage over off-road environment.

Figure 12:
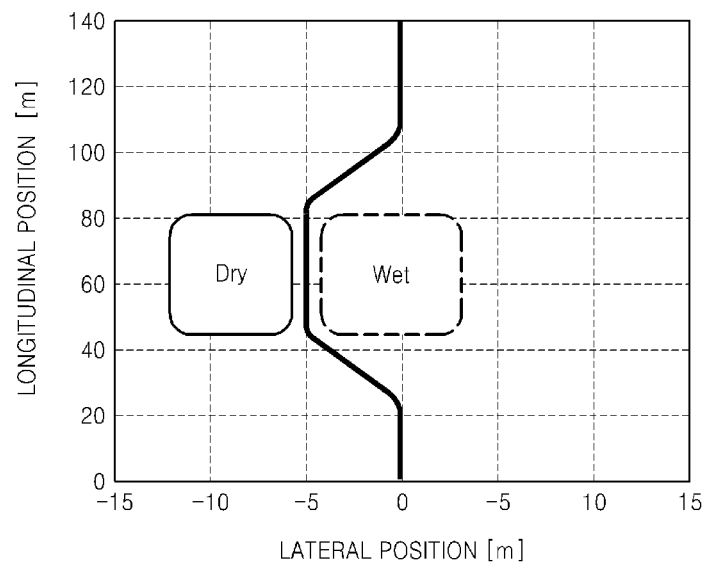
FIG. 12 is a graph illustrating a road condition for testing a performance of the vehicle of FIG. 1, according to an exemplary embodiment.

FIG. 12 is a graph illustrating a road condition for testing a performance of the vehicle 10 of FIG. 1. A performance of a general control system of the vehicle 10 of FIG. 1 was simulated in the road condition shown in FIG. 12.

In FIGS. 13 through 18, a case 1 is a case in which input torques applied to wheels are the same, and an existing system provided with an engine and a transmission was simulated. A case 2 is a case in which an input torque is applied to each wheel by using optimal control distribution. A road is in a double lane change state as shown in FIG. 12, and has an asymmetric friction road surface having a right friction coefficient that is reduced from 0.9 to 0.4.

FIGS. 13 through 18 illustrate simulation results under the above conditions. It is found from the simulation results that the case 2 using a driving control algorithm has higher stability than the case 1.

Figure 13:
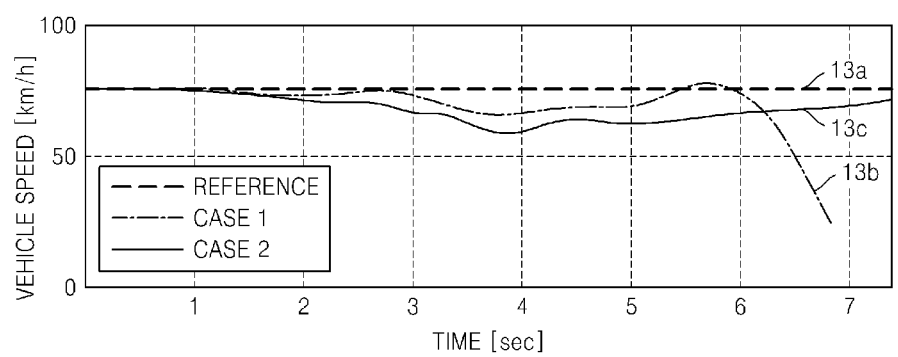
FIG. 13 is a graph illustrating a vehicle speed in a first case and a second case under the road condition of FIG. 12, according to an exemplary embodiment.
Figure 14:
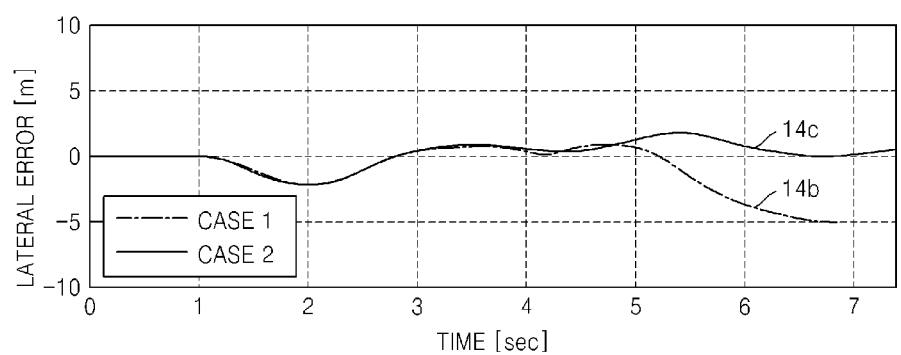
FIG. 14 is a graph illustrating a lateral error in the first case and the second case under the road condition of FIG. 12, according to an exemplary embodiment.
Figure 15:
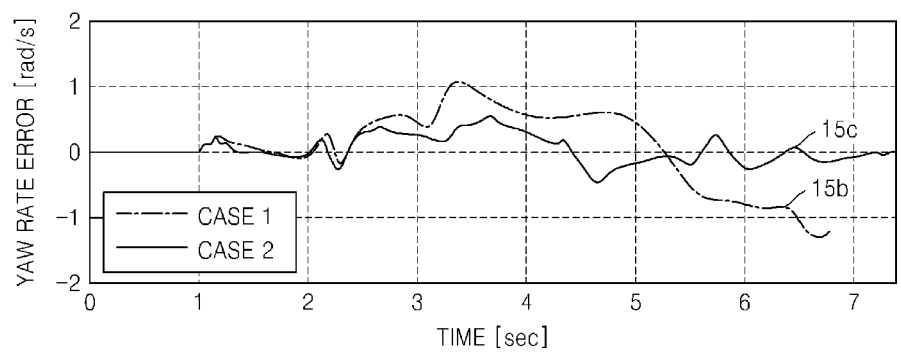
FIG. 15 is a graph illustrating a yaw rate error in the first case and the second case under the road condition of FIG. 12, according to an exemplary embodiment.
Figure 16:
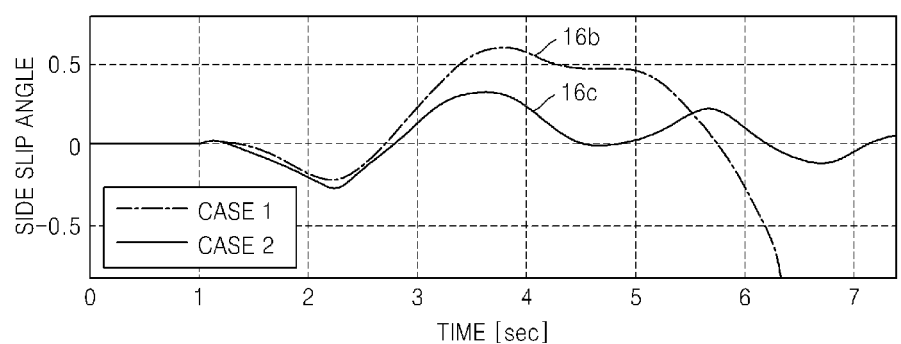
FIG. 16 is a graph illustrating a side slip angle in the first case and the second case under the road condition of FIG. 12, according to an exemplary embodiment.

Referring to FIGS. 13 through 18, a vehicle speed of FIG. 13, a lateral error of FIG. 14, a yaw rate error of FIG. 15, and a side slip angle of FIG. 16 is better in the case 2 where optimal distribution is performed by using the driving control algorithm than in the case 1.

Figure 17:
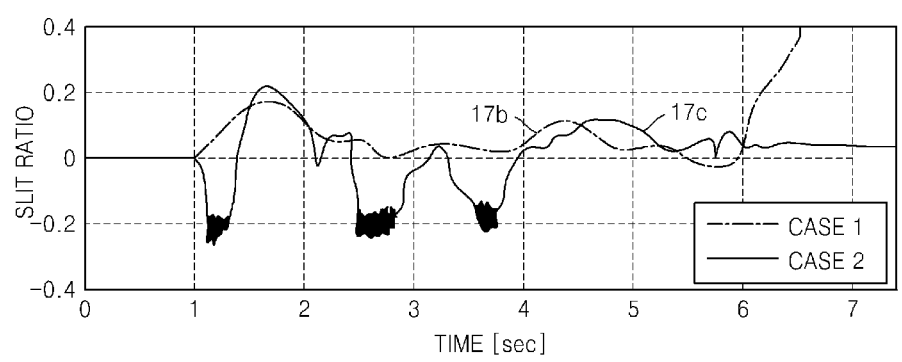
FIG. 17 is a graph illustrating a slip ratio in the first case and the second case under the road condition of FIG. 12, according to an exemplary embodiment.
Figure 18:
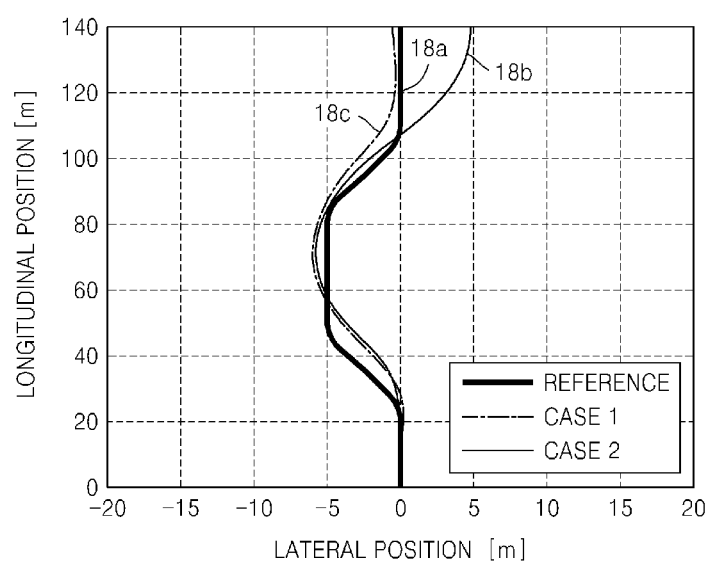
FIG. 18 is a graph illustrating a longitudinal position in the first case and the second case under the road condition of FIG. 12, according to an exemplary embodiment.

Also, it is found from the simulation result of FIG. 17 that a slip of each wheel is controlled not to exceed a maximum slip ratio by a wheel slip controller. Also, as shown in FIG. 18, the case 2 assures stability of the vehicle even in response to a driver's sharp steering input when avoiding an obstruction.

According to the above exemplary embodiments, since driving and/or braking inputs to be applied to at least some wheels in response to an operation input are determined and these wheels are independently driven, driving performance and/or stability may be improved While the inventive concept has been particularly shown and described with reference to exemplary embodiments thereof, it will be understood by those of ordinary skill in the art that various changes in form and details may be made therein without departing from the spirit and scope of the inventive concept as defined by the following claims.

What is claimed is:

1. A vehicle with independently driven multiple axles, the vehicle comprising:
    a plurality of wheels;
    an operation input unit which receives an operation input comprising at least one of a steering input, an acceleration input, and a braking input;
    a first controller which determines a target control value comprising at least one of a mechanical steering angle of each of the plurality of wheels, a target yaw moment of the vehicle, a target longitudinal force of the vehicle, and a target wheel speed of each of the plurality of wheels, from the operation input, according to a driving condition of the vehicle; and a second controller which determines wheel torques of the plurality of wheels, which drive the plurality of wheels independently, based on the target control value, wherein the operation input comprises the steering input, wherein the first controller receives the steering input and a target speed of the vehicle and determines the mechanical steering angle of each of the plurality of wheels, the target yaw moment of the vehicle, and the target longitudinal force of the vehicle, and wherein, for a wheel torque control, the second controller determines a tire force of each of the plurality of wheels by receiving the target longitudinal force of the vehicle and the target yaw moment of the vehicle, and distributing the target longitudinal force of the vehicle and the target yaw moment of the vehicle as a force to be exerted at a bottom of a tire of each of the plurality of wheels, and determines the wheel torques of the plurality of wheels by wheel slip control from the tire force of each of the plurality of wheels.

2. The vehicle of claim 1, wherein the wheel torques of the plurality of wheels, which drive the plurality of wheels independently, are different from one another.

3. The vehicle of claim 1, further comprising:

motors which drive the plurality of wheels through the wheel torques, respectively;

a plurality of brakes which are installed on the plurality of wheels, respectively; and a steering means which is linked to at least one of the plurality of wheels and adjusts a steering angle of the at least one of the plurality of wheels.

4. The vehicle of claim 3, wherein the driving condition comprises at least one of:

a normal driving mode in which the vehicle is controlled by at least one of mechanical steering, complex braking, stability control, and slip control, wherein the mechanical steering is performed by the steering means to adjust the steering angle, and the complex braking comprises regenerative braking generated by the motors and braking generated by the plurality of brakes;

a quick turning driving mode in which the vehicle is controlled by at least one of complex steering, the complex braking, the stability control, and the slip control, wherein the complex steering comprises the mechanical steering and wheel torque steering; and a pivot turning mode in which the vehicle is controlled by the complex steering, wherein the complex steering for the pivot turning mode does not include the mechanical steering.

5. The vehicle of claim 4, wherein the vehicle is controlled by a steering control program comprising at least one of the mechanical steering, the stability control, the wheel torque control, and wheel speed control according to a driving situation.

6. The vehicle of claim 5, wherein the driving situation is determined by at least one of a speed of the vehicle and a condition of a road on which the vehicle is driven.

7. The vehicle of claim 1, wherein the first controller determines:

the mechanical steering angle of each of the plurality of wheels from the steering input;

a target yaw rate of the vehicle from the mechanical steering angle of each of the plurality of wheels in consideration of a time delay; and the target yaw moment of the vehicle by feeding back a measured yaw rate of the vehicle to the target yaw rate of the vehicle to perform yaw rate control.

8. The vehicle of claim 7, wherein for the yaw rate control, the target yaw moment of the vehicle is determined by a sliding control method in which a difference between the measured yaw rate of the vehicle and the target yaw rate of the vehicle is converged to 0 by enabling a differential coefficient of the difference relative to time to always have a sign opposite to that of the difference.

9. The vehicle of claim 7, wherein the first controller determines the target longitudinal force of the vehicle using a Proportional Integral Derivative (PID) control method based on difference between the target speed of the vehicle and a measured speed of the vehicle.

10. The vehicle of claim 1, wherein the vehicle is a type of a 4-wheel vehicle, a 6-wheel vehicle, or an 8-wheel vehicle, and the target yaw moment is determined according to the type of the vehicle.

11. The vehicle of claim 1, wherein a friction circle is determined from a maximum force which is generated in each of the plurality of wheels according to a driving situation, and the tire force is determined in proportion to a size of the friction circle.

12. The vehicle of claim 11, wherein the tire force of each of the plurality of wheels is determined by using optimal distribution of force using a performance index proportional to the size of the friction circle.

13. The vehicle of claim 12, wherein a friction force of each of the plurality of wheels is estimated and input, and the performance index proportional to the size of the friction circle is obtained.

14. The vehicle of claim 13, wherein the size of the friction circle is estimated from a linear function having a linear relationship between a slip ratio and a longitudinal tire force as an input, the linear relationship being configured to minimize a difference between a first longitudinal tire force and a second longitudinal tire force, wherein the first longitudinal tire force is determined by applying a slip ratio, which is estimated based on a wheel speed and a vehicle speed, to the linear relationship between the slip ratio and the longitudinal tire force, and wherein the second longitudinal tire force is estimated based on a wheel torque and a wheel angular acceleration that is obtained from the wheel speed.

15. The vehicle of claim 14, wherein the linear relationship between the slip ratio and the longitudinal tire force is configured such that the difference is minimized using a Recursive Least Square method.

16. The vehicle of claim 14, further comprising a vehicle speed estimator configured to:

estimate a first vehicle speed based on a vehicle yaw rate and wheel speed of wheels having the wheel angular acceleration equal to or less than a threshold, estimate a second vehicle speed based on a longitudinal vehicle acceleration, and estimate the vehicle speed by adding the first vehicle speed and the second vehicle speed.

17. The vehicle of claim 1, wherein if the first controller determines the target wheel speed of each of the plurality of wheels, the target wheel speed of each of the plurality of wheels is calculated by reflecting a slip ratio of each of the plurality of wheels, a difference between the target wheel speed of each of the plurality of wheels and a wheel speed of each of the plurality of wheels is defined as a sliding surface, and each of the wheel torques is determined by inserting a state condition for converging the sliding surface to 0 into a wheel torque equation of each of the plurality of wheels.

18. The vehicle of claim 17, wherein if the slip ratio of each of the plurality of wheels does not exceed a maximum slip ratio, each of the wheel torques is directly determined from the tire force determined by distribution of the tire force.

19. The vehicle of claim 17, wherein the wheel speed of each of the plurality of wheels and the tire force of each of the plurality of wheels are estimated and input.

20. The vehicle of claim 1, wherein the operation input comprises the steering input, and
wherein the first controller receives the steering input and a target speed of the vehicle, and determines the mechanical steering angle of each of the plurality of wheels and the target wheel speed of each of the plurality of wheels.

21. The vehicle of claim 20, wherein the first controller determines:
the mechanical steering angle of each of the plurality of wheels from the steering input;
a target yaw rate of the vehicle from the mechanical steering angle of each of the plurality of wheels in consideration of a time delay; and
the target wheel speed of each of the plurality of wheels by adding a wheel speed of each of the plurality of wheels due to feedforward control and a wheel speed of each of the plurality of wheels due to feedback control using a difference between the target yaw rate of the vehicle and a measured yaw rate of the vehicle.

22. The vehicle of claim 20, wherein the second controller:
determines a difference between the target wheel speed of each of the plurality of wheels and a wheel speed of each of the plurality of wheels;
determines a driving torque input by using an adaptive sliding method in which a tire force of each of the plurality of wheels is an unknown element; and
determines the wheel torques by estimating the unknown element by using Lyapunov stability.

23. A controller which independently drives multiple axles, the controller comprising:
a control unit which generates at least one target control value from an operation input, determines driving forces of a plurality of wheels of a vehicle independently, based on the at least one target control value and according to a driving situation of the vehicle, and controls motors configured to respectively drive the plurality of wheels based on the determined driving forces,
wherein the driving forces are different from each other,
wherein the at least one target control value is one or more of a steering angle of each of the plurality of wheels, a target yaw moment of the vehicle, a target longitudinal force of the vehicle, and a target wheel speed of each of the plurality of wheels,
wherein the operation input comprises a steering input,
wherein the control unit receives the steering input and a target speed of the vehicle, and determines the steering angle of each of the plurality of wheels, the target yaw moment of the vehicle, and the target longitudinal force of the vehicle,
wherein, for wheel torque control, the control unit determines a tire force of each of the plurality of wheels based on the target longitudinal force of the vehicle and the target yaw moment of the vehicle, distributes the target longitudinal force of the vehicle and the target yaw moment of the vehicle as a force to be exerted at a bottom of a tire of each of the plurality of wheels, and determines wheel torques of the plurality of wheels by wheel slip control from the tire force of each of the plurality of wheels.

24. The controller of claim 23, wherein, according to the driving situation, the control unit controls a wheel torque of each of the plurality of wheels or a wheel speed of each of the plurality of wheels to determine the driving forces.

25. The controller of claim 24, wherein the control unit controls the wheel torque if the driving situation comprises driving on a normal road, and
wherein the control unit controls the wheel speed if the driving situation comprises driving on an off-road.

26. The controller of claim 23, further comprising a measurement and estimation unit which measures a current value comprising at least one of a current longitudinal speed of the vehicle, a current yaw rate of the vehicle, a current wheel speed of each of the plurality of wheels and a current wheel torque of each of the plurality of wheels,
wherein the control unit uses the current value to generate the at least one target control value.

27. The controller of claim 26, wherein the measurement and estimation unit estimates an estimation value which comprises a friction force of each of the plurality of wheels, and
wherein the control unit determines the driving forces using the estimation value.

28. The vehicle of claim 16, further comprising counting a number of wheels having the wheel angular acceleration greater than the threshold,
wherein the estimating the vehicle speed comprises adjusting a sum of the first vehicle speed and the second vehicle speed based on a number of wheels having the wheel angular acceleration greater than the threshold.

* * * * *